(12) United States Patent
Johnson

(10) Patent No.: US 8,393,111 B1
(45) Date of Patent: Mar. 12, 2013

(54) EASY ATTACH FISHING ROD HOLDER

(76) Inventor: Jeffrey A. Johnson, Palm Bay, FL (US)

( * ) Notice: Subject to any disclaimer, the term of this patent is extended or adjusted under 35 U.S.C. 154(b) by 386 days.

(21) Appl. No.: 12/653,057

(22) Filed: Dec. 8, 2009

Related U.S. Application Data

(60) Provisional application No. 61/201,504, filed on Dec. 11, 2008.

(51) Int. Cl.
*A01K 97/10* (2006.01)

(52) U.S. Cl. .......... 43/21.2; 211/70.8; 224/488

(58) Field of Classification Search .......... 43/21.2, 43/26, 54.1; 211/62, 64, 70.2, 70.8; 224/488, 224/531–533, 537, 545, 562, 913, 922, 316, 224/318
See application file for complete search history.

(56) References Cited

U.S. PATENT DOCUMENTS

| | | | |
|---|---|---|---|
| 1,494,325 A * | 5/1924 | Rathbun | 293/38 |
| 2,390,743 A * | 12/1945 | Simmons | 335/295 |
| D179,525 S | 1/1957 | Porter | |
| 2,844,291 A * | 7/1958 | McPheeters | 224/317 |
| 2,914,819 A * | 12/1959 | Janos | 49/478.1 |
| 2,959,295 A * | 11/1960 | Howard et al. | 211/64 |
| 3,266,633 A | 8/1966 | Graebner | |
| 3,746,177 A | 7/1973 | Vilotti | 211/64 |
| 4,293,113 A | 10/1981 | Gray | 248/518 |
| 4,852,780 A | 8/1989 | Woodbury | 224/42.45 |
| 4,871,099 A * | 10/1989 | Bogar, Jr. | 224/566 |
| 5,033,223 A * | 7/1991 | Minter | 43/21.2 |
| 5,131,179 A * | 7/1992 | McEwen | 43/21.2 |
| 5,205,446 A * | 4/1993 | Greenberg | 224/497 |
| 5,595,333 A * | 1/1997 | Boston | 224/536 |
| 5,715,952 A | 2/1998 | Chichetti | 211/70.8 |
| 5,815,976 A * | 10/1998 | Jernigan et al. | 43/21.2 |
| 6,237,824 B1 * | 5/2001 | Bagley | 224/521 |
| 6,267,425 B1 | 7/2001 | Dorsey | 294/143 |
| 6,345,748 B1 * | 2/2002 | Chimenti et al. | 224/324 |
| 6,510,953 B2 | 1/2003 | Daniels | 211/60.1 |
| 6,678,991 B2 | 1/2004 | Hooks et al. | 43/21.2 |
| 6,793,184 B2 | 9/2004 | Dougal et al. | 248/206.5 |
| 6,931,782 B1 | 8/2005 | Pitcock | 43/21.2 |
| D572,115 S | 7/2008 | Cunningham et al. | D8/354 |
| 2005/0218285 A1 | 10/2005 | Yorns et al. | 248/314 |
| 2008/0087785 A1 | 4/2008 | Roche | 248/309.4 |

* cited by examiner

*Primary Examiner* — David Parsley
*Assistant Examiner* — Danielle Clerkley
(74) *Attorney, Agent, or Firm* — Brian S. Steinberger; Law Offices of Brian S. Steinberger, P.A.

(57) ABSTRACT

A holder device attaching to a vehicle with a releasable attachment strip flexibly attached to a main body and having receptacles for holding a fishing rod. The attachment strip is releasably attached to a vehicle with a magnet or suction cup array. The attachment strip has a pair of connector arms attached to a top portion of the main body. Horizontal bars attached to the main body and the receptacles holding the fishing rod provide resilience and flexibility. A hinge on each of the pair of connector arms facilitates limited movement of the holder device absorbing loads applied during movement of the vehicle. An adjustable strut attached to a lower portion of the main body has a pad at one end providing another contact point on the vehicle. A handle attached to the body or horizontal bars facilitates carrying after detaching from the vehicle. A retaining strap may be attached to the vehicle and the holder device. The combination of the attachment strip, flexible connector arms, and horizontal bars permits the holder device to remain securely attached to the vehicle at highway speeds and along bumpy roads and is yet easily removed when desired.

31 Claims, 17 Drawing Sheets

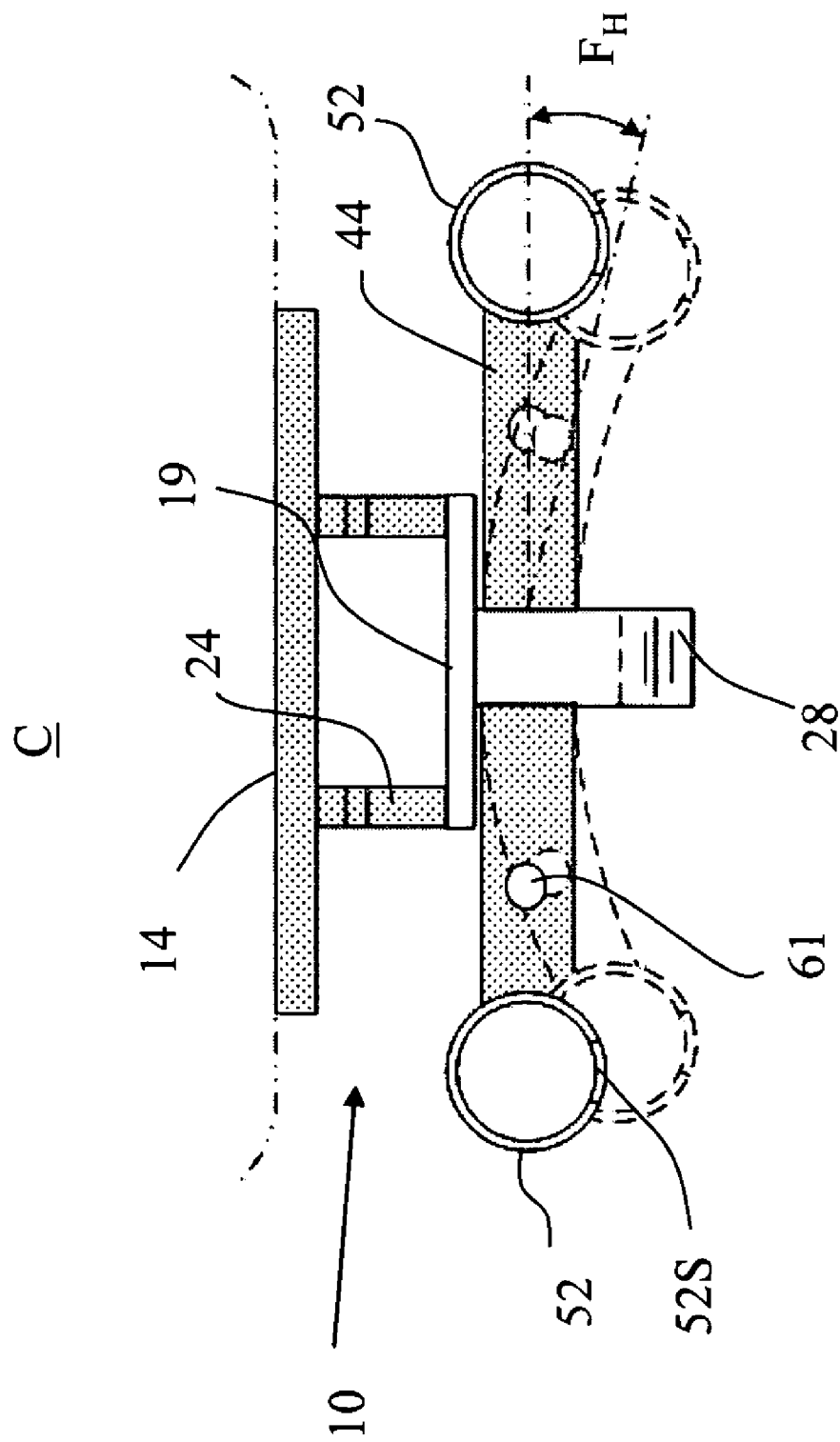

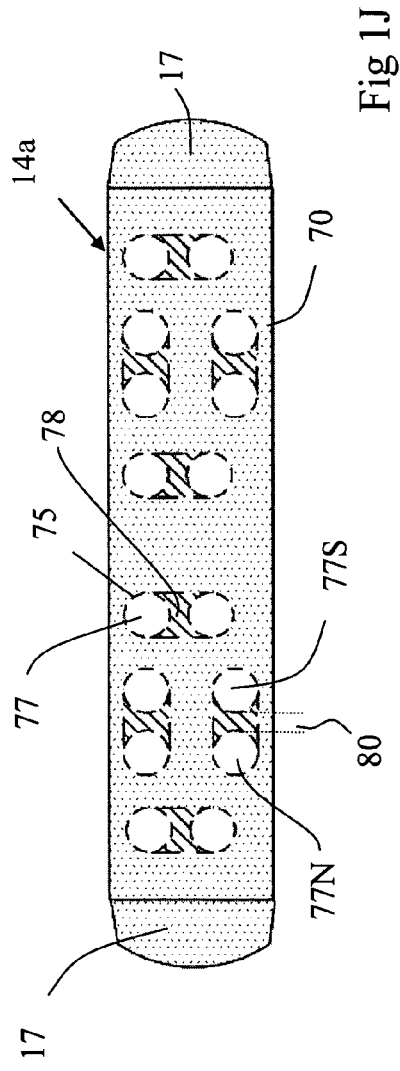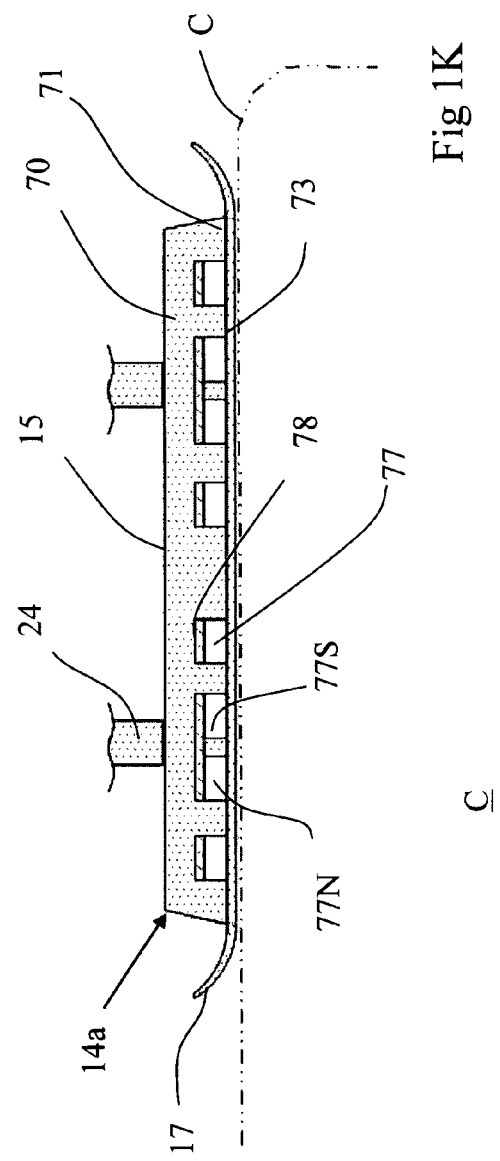

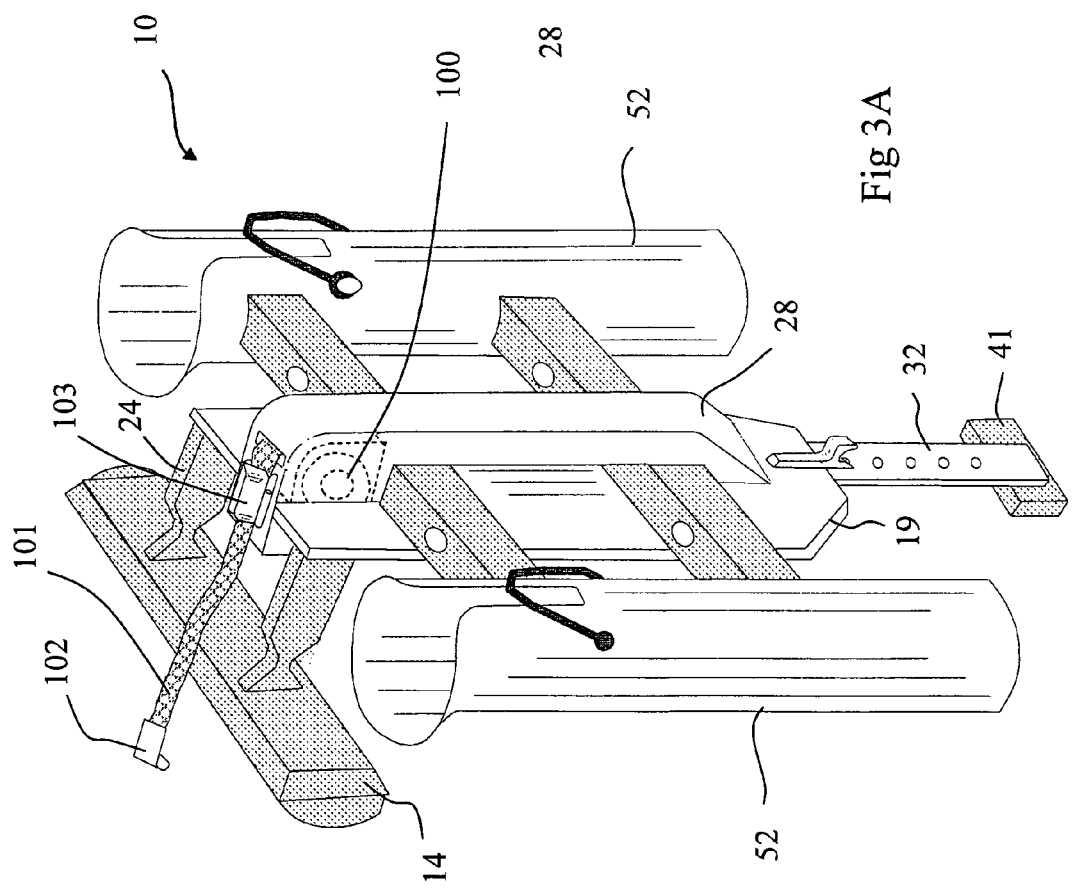

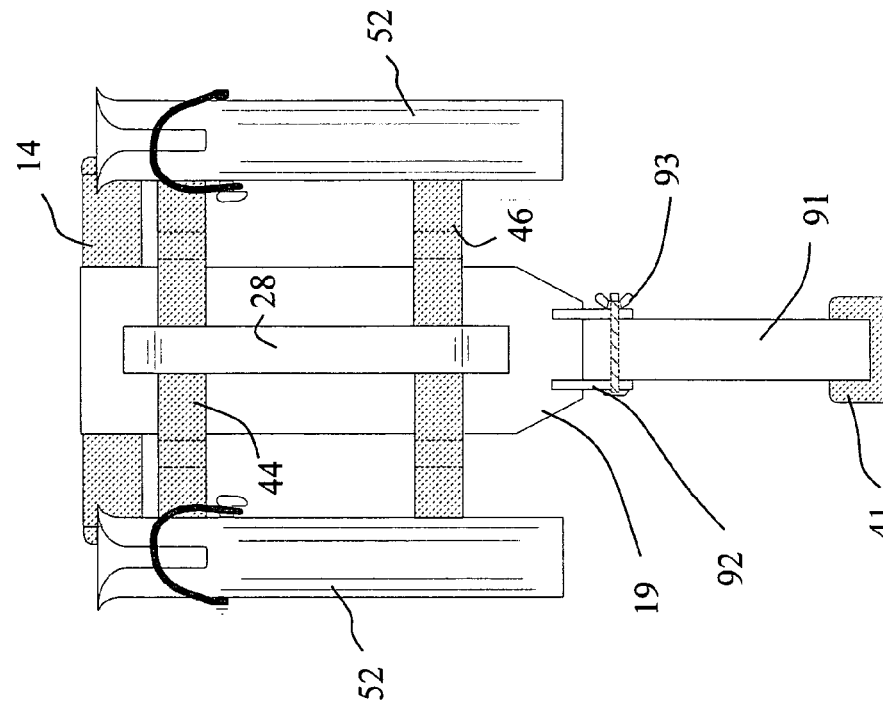
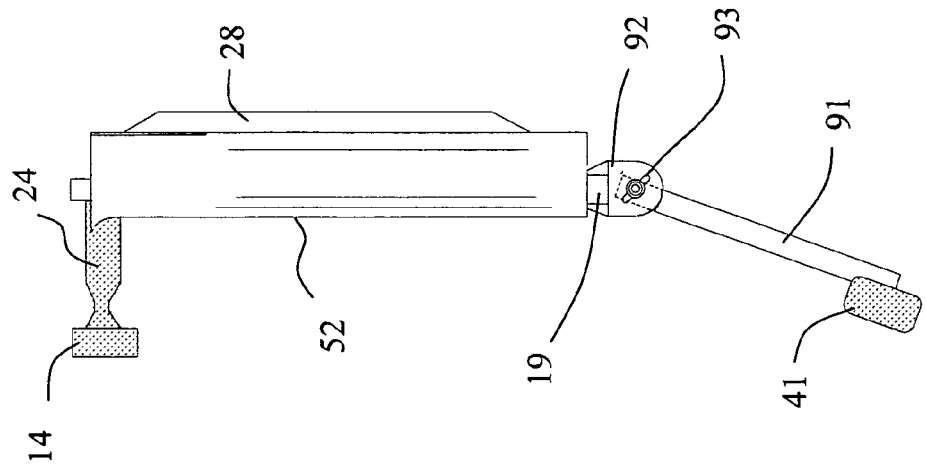
Fig 5B
Fig 5A

EASY ATTACH FISHING ROD HOLDER

RELATED APPLICATION

This application claims the benefit of U.S. Provisional Application No. 61/201,504 filed Dec. 11, 2008.

BACKGROUND OF THE INVENTION

1. Field of Invention

The present invention relates generally to a fishing rod holding device, and more particular to a fishing rod device that is easily attachable to a host of vehicles for the purpose of transporting the fishing rods to a desired fishing location.

2. Description of Prior Art

Fishing is a very popular and exiting sport. Perhaps not so exciting is the challenge in carrying fishing poles to and from the desired fishing spot, particularly when transport with an automobile is required. The problem is exacerbated when bringing multiple rods on fishing excursions. The prior art contains several rod holders available to aid such transport, but each of the existing devices have one deficiency or another.

One such prior fishing rod holder is disclosed in U.S. Pat. No. 6,267,425 issuing to Dorsey on Jul. 31, 2001. Therein disclosed is a rod carrying device that uses a handle integral to a main body portion that can carry a multitude of rods, and a strap is used to secure the rods to the holder. By mounting a separate mounting member, the rod holder can quickly be attached to a vehicle, wall of a garage, etc. The disadvantage with this device is that a separate mounting piece must be purchased, and then permanently attached, to every vehicle you desire to use the carrier on. In addition, attaching the rods to the device is cumbersome relative to the current invention.

Another rod holder is disclosed in U.S. Pat. No. 5,715,952 issuing to Chichetti on Feb. 10, 1998. Therein disclosed is a rod holder that can be attached and de-attached to appropriate surfaces by the use of suction cups. The suction cups mount to two horizontal longitudinal members, and on the opposite side of the longitudinal members are attached vertically oriented hollow tubes. Fishing rods are able to be placed upright in the tubes. One embodiment of Chichetti breaks the longitudinal members into sections and provides an interlock between the sections that adds a pivoting capability between the sections. This allows the device to conform to a curvature in the horizontal plane of the object it attaches to. Although mention is made that it may be used on any non-porous surface, the Chichetti device is primarily designed for boat usage since tall gunwales are typically available that provide a surface that is relatively straight and flat in the vertical dimension. Chichetti has many disadvantages in its application to automotive use. For example, Chichetti requires two horizontal members vertically separated to mount the device to the vehicle attachment means or suction cups of the device. Chichetti does not provide means for adjustment of the vertical spacing between the longitudinal members, nor does it provide for adjustment of the angles in which the suction cups attach to the vehicle. These limitations will significantly impact the number of automobiles it can be used on as the contours in the vertical plane of automobiles can vary substantially across different automobile types. Additionally, there is no provision for handling rough roads. The attachment between the suction cups and the longitudinal members, and between the longitudinal members and rod holding receptacles are rigid, and thus the added gravitational-force or g-force associated with rapid acceleration and deceleration of the mass of the poles when bumps are hit, are directly transferred to the suction cups. Therefore, more suction cups, or more expensive suction cups to handle the force are required.

Another suction cup based device is commercially available, and is made for automobile use. The device is sold under the trademark "The Rack'N Go Storage and Carry System". It mounts the rods horizontally, and requires a large flat rear window. Thus, it is primarily suited for trucks, SUVs, and possibly mini-vans. Although convenient for its intended usage, it is not suited to smaller vehicles and it is limited to shorter fishing rods.

Several magnetic based rod holders, suitable to moving vehicles and requiring no permanent attachment pieces, are available commercially by various manufactures. These devices use two separate attachment pieces that magnetically adhere to the auto. One attachment is placed on the front hood, while the other is placed on the roof. The hood piece incorporates a sheet style magnet placed horizontally on the front hood of an automobile. Perpendicularly attached to this magnet rises a tube vertically several inches high at which point the tube forms a "T". Fishing poles are affixed to the top of the T by placing a retaining strap or cord around each pole in proximity to the reel. The roof mount magnetic also mounts horizontally, and contains a mount or groove for the tip of the poles, again typically held down with a strap. These devices have the disadvantage of requiring two separate magnetic attachment strips, plus it obstructs the view of the driver and passengers, and provides no means to carry the rods and holding device as one unit to or from the vehicle. Perhaps the biggest disadvantage is that these holding devices are not suitable for highway use, as so stated in the sales literature. One specific example of these devices is the "Professor Bodkin Onstream Rod Carrier", available at Cabela's outfitters web site.

The patent literature includes several magnetic rod attachment devices for the more limited purpose of holding or securing the rods in an upright position while the vehicle is stationary. As such, these are typically designed to attach a rod near the rod tip, not near the reel, or at most midway between the reel and the rod tip, and the butt end of the rod resting on the ground. U.S. Pat. No. 3,746,177 entitled "Portable Magnetic Rack for Guns, Fishing Rods, and the Like" issuing to Vilotti on Jul. 17, 1973 provides such a device. Therein disclosed is a flexible surface to conform to the surface of the automobile with said surface being impregnated with magnetic particles. U.S. Pat. No. 3,266,633 entitled "Portable Holder for Guns and Rods" issuing to Graebner on Aug. 16, 1966 is another similar device. Therein disclosed is a more general magnetic structure. The device disclosed in Graebner does include a height adjustment capability and a flexible substrate. However, the vertical adjustment is to help prevent the rod from scratching the vehicle body.

While these prior rod or gun holding devices work well for their intended purpose, they do not serve the purpose of securing a device to a vehicle moving at high speed or down bumpy roads. Therefore, there is a need for an improved rod holder that requires no modification of the vehicle, but yet is securely and safely attached to the vehicle even when traveling at high speeds or along bumpy roads.

SUMMARY OF THE INVENTION

The present invention provides for an improved fishing rod holder device for use with vehicles or automobiles. The holder device comprises a plurality of fishing rod receptacles connected by horizontal bars attached to a main body having a handle. Connector arms attach the top of the main body to an attachment strip. The attachment strip comprises means for releasably attaching to an automobile, and preferably comprises permanent magnets or suction cups. The connector arms are preferably flexible and have a hinge providing limited movement. On the bottom of the main body is an adjustable strut and pad. The adjustable strut and pad provide another contact point on an automobile.

The present invention more adequately accounts for the forces of wind and road conditions compared to those found in the prior art. This allows the present invention to operate at full highway speeds and on rough roads. In its simplest embodiment, the holder device of the present invention comprises a substantially horizontal flexible attachment strip that attaches to the rear of an automobile, typically mounting at the top of the vertical section of the trunk. The attachment strip contains either embedded magnets, or suction cups that will releasably hold the device to the automobile. A pair of connector arms jettisons from the strip and serve to connect the attachment strip to a vertically oriented elongated main body. The connector arms connect proximate the top of the main body. Parallel to the device body are two fishing rod receptacles, one on each side of the device body. At the bottom of the main body is a pad, which will allow the bottom of the holder device to rest on a bottom portion of the automobile, typically resting on the bumper. The fishing rods sit vertically in the fishing rod receptacles with the reel of each fishing rod being at or slightly below the top of the trunk. As the vehicle travels down the road, wind resistance will tend to push the rods back, and the device will want to pivot around the top of the main body where the connector arms and the attachment strip connect. This creates a force attempting to pull the attachment strip off the vehicle or automobile and a force tending to push the pad at the bottom of the device body into or against the vehicle or automobile.

Other embodiments add several features that enable the holder device to be widely adaptable to a multitude of automobile types, and add features that enhance the effectiveness of the holder device to handle the resulting forces associated with wind and road conditions. These include utilizing flexible resilient materials in the composition of the connector arms and to the mounts or horizontal bars that secure the fishing rod receptacles to the device body, a hinge in the connector arms to allow the attachment strip to pivot relative to the rest of the holder device, and providing means to extend or reduce the length of the device body with the use of a telescoping strut at the bottom of the device body. Various other embodiments add a safety strap near the top of the device, as well as other features.

Accordingly, it is an object of the present invention to provide a fishing rod holder device that easily, securely, and releasably attaches to a vehicle.

It is another object of the present invention to provide a fishing rod holder device that is easily released from a vehicle and easily carried with the fishing rods attached.

It is yet another object of the present invention to provide a fishing rod holder device that is easily manufactured.

It is an advantage of the present invention that the fishing rod holder device is flexible and absorbs loads placed on the holder device from movement of the vehicle or automobile.

It is another advantage of the present invention that it is adjustable and can be placed on different locations of the vehicle or automobile.

It is yet another advantage of the present invention that it can be mounted many different types of vehicles or automobiles without requiring separate mounting pieces to be permanently attached to the vehicle.

It is a feature of the present invention that flexible connector arms are used between an attachment strip and the main body of the device.

It is another feature of the present invention that a hinge is formed on the connector arms.

It is yet another feature of the present invention that a strut and pad are used as a contact point away from the attachment strip.

These and other objects, advantages, and features will become more readily apparent in view of the following more detailed description.

BRIEF DESCRIPTION OF THE DRAWINGS

FIG. 1E is a top view illustrating an embodiment of the present invention.

FIG. 1J is a front elevational view illustrating an attachment strip using magnets of an embodiment of the present invention.

FIG. 1K is a side elevational view illustrating an attachment strip using magnets of an embodiment of the present invention.

FIG. 3A is a perspective view illustrating an embodiment of the present invention having a safety strap.

FIG. 5A is a side view schematically illustrating another embodiment of the present invention having a pivoting or rotating strut.

FIG. 5B is a front view schematically illustrating the embodiment illustrated in FIG. 5A.

DETAILED DESCRIPTION OF THE PREFERRED EMBODIMENTS

Figure 1B:
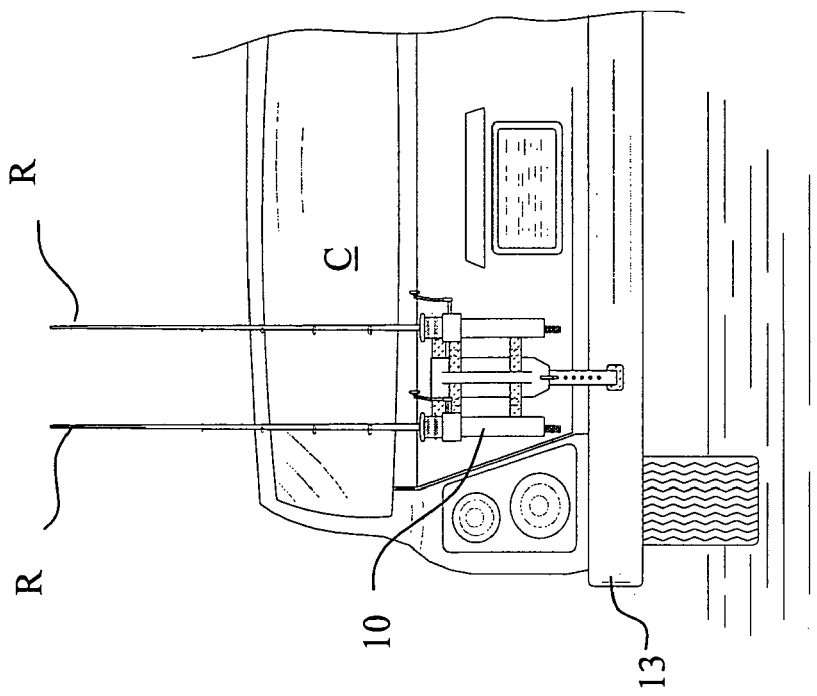
FIG. 1B is a front elevational view illustrating the holder device of an embodiment of the present invention attached to a vehicle or automobile.
Figure 1A:
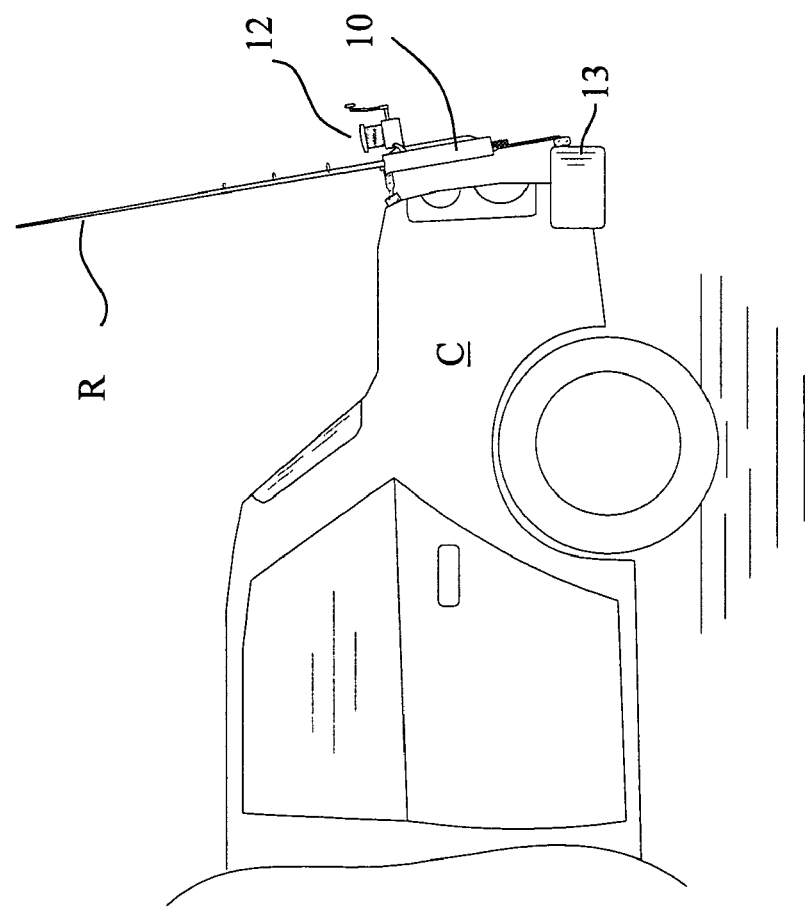
FIG. 1A is a side elevational view illustrating the holder device of an embodiment of the present invention attached to a vehicle or automobile.

FIGS. 1A and 1B schematically illustrate a side and front environmental view of the preferred embodiment of a fishing rod holder device 10 attached to a sedan style automobile C and holding two fishing rod and reels R in an approximately vertical orientation.

Figure 1C:
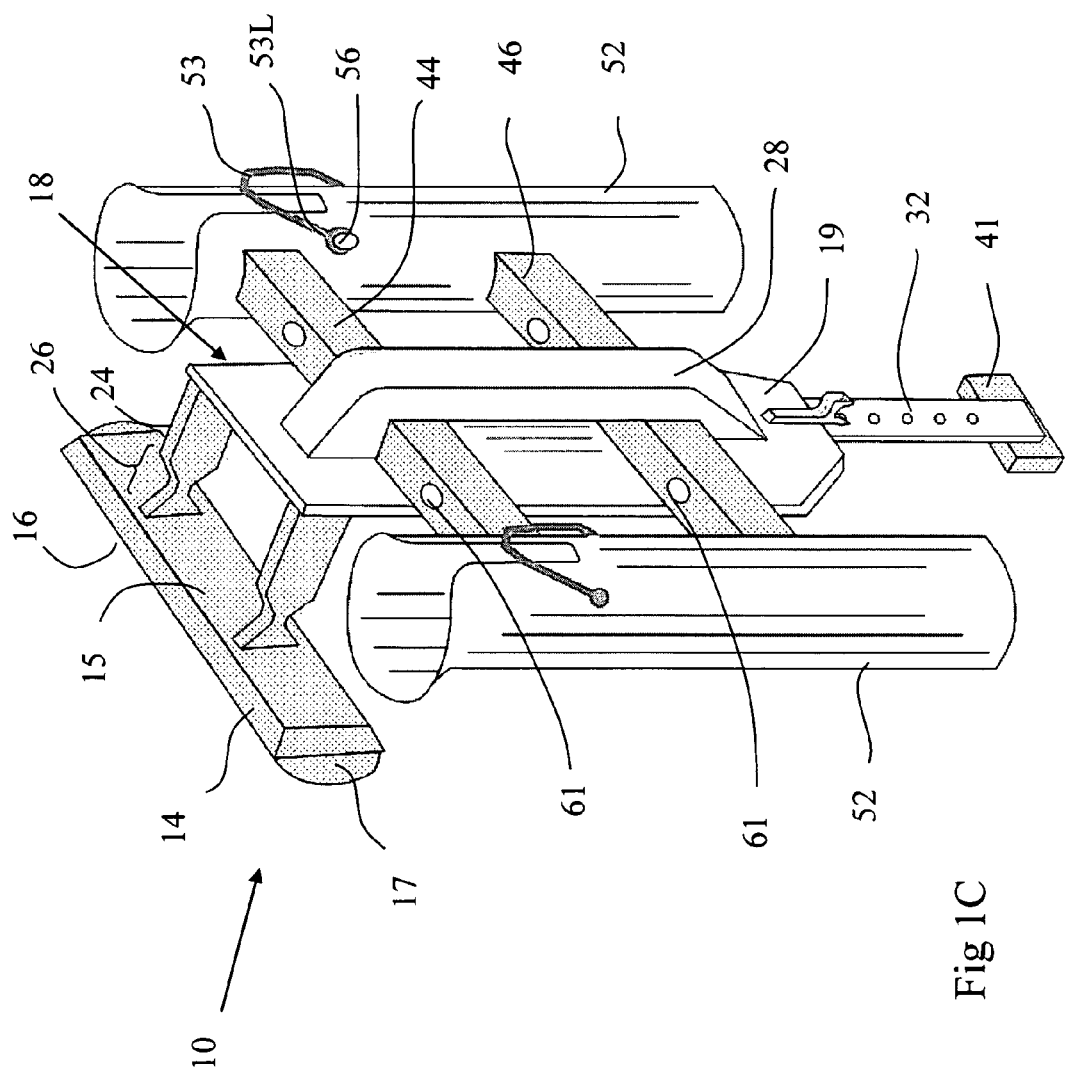
FIG. 1C is a perspective view illustrating an embodiment of the present invention.
Figure 1D:
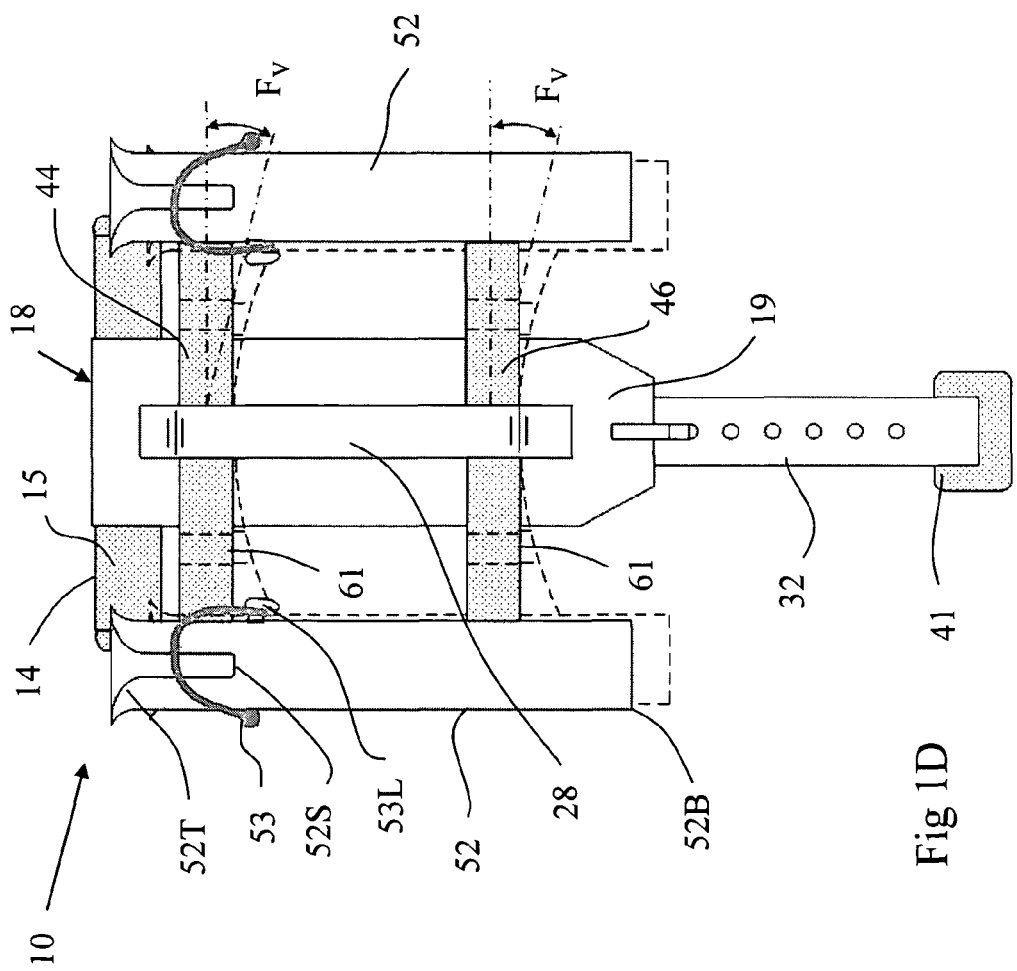
FIG. 1D is a front elevational view illustrating an embodiment of the present invention.

FIGS. 1C and 1D more clearly illustrate the embodiment of the device of that shown in FIGS. 1A and 1B. Holder device 10 mounts to vehicle C with an attachment strip 14. The strip 14 is flexible in both the horizontal and vertical dimensions to enable it to conform to the various curvatures found on automobile or vehicle C trunk. The strip 14 is thin, and primarily rectangular in shape. On the back side 16 of strip 14 is included a temporary attachment means whereby the strip 14 attaches to the vehicle C body in a temporary fashion. In the preferred embodiment, magnets (not illustrated in FIGS. 1A-1D) provide the temporary attachment means. The magnets within the strip create a sufficient attraction force on the back side 16 of strip 14 to adequately secure the device 10 to an appropriate underlying ferrous steel area of the vehicle C. Pull tabs 17 are located on both sides of the temporary attachment means or magnetic strip to aid releasing the attachment strip 14. Perpendicularly mounted to the front surface 15 of attachment strip 14 are two parallel connector arms 24, which serve to connect the attachment strip 14 to an elongated main body 18. Each arm 24 containing a hinge 26 allowing the attachment strip 14 to pivot vertically relative to the rest of the device. The connector arms 24 are made from a resilient material.

The device main body 18 includes a base 19, a strut 32, and a handle 28. Base 19 is vertically oriented, and connector arms 24 mount perpendicularly to and proximate the top of the base 19, as illustrated in FIG. 1C. With reference to FIGS. 1C and 1D, the strut 32 projects out of the bottom of the base 19 and is vertically oriented. The strut includes a pad 41 near the bottom of the strut 32 that faces the back side of the device 10, and therefore faces towards the vehicle or automobile. This pad will rest against the vehicle, in most applications it will rest against the bumper. The length of the strut 32 is adjustable in height, allowing the vertical distance between the attachment strip 14 and pad 41 to be adjusted to fit various vehicle or automobile contours. The handle 28 is oriented vertically, and attaches to the front surface of the base 19 near the top and the bottom of the base 19.

With reference to FIGS. 1C and 1E, also attached to the base 19 are two horizontal bars, a top horizontal bar 44 and a bottom horizontal bar 46, which are designed to allow flexure in the vertical and horizontal directions. FIG. 1D shows in phantom the flexing of horizontal bars 44 and 46 in the vertical direction an angular distance $F_v$. FIG. 1E shows in phantom the flexing of horizontal bars 44 and 46 in the horizontal direction an angular distance $F_H$. This aids in absorbing shock loads when moving and aids in preventing the holder device 10 from being knocked off the vehicle or automobile. Both horizontal bars 44 and 46 further attach to two fishing rod receptacles 52, with the receptacles attaching to the outermost ends of the two horizontal bars 44 and 46. The fishing rod receptacles 52 are those found commonly in the industry, each are appropriately oriented to hold a fishing rod R vertically as illustrated in FIGS. 1A and 1B. In the preferred embodiment rod receptacles 52 consist of hollow tubular members which further include an open top 52T and an open bottom 52B. The open top 52T includes a slit 52S on one side that extends down from the open top 52T. A reel section of a fishing rod and reel combination will slide into the slit 52S and rest at the bottom of the slit 52S. A retaining strap 53 is utilized to help retain the rods R, as illustrated in FIGS. 1A and 1B, within the holder.

Horizontal bars 44 and 46 also include four apertures 61, which are vertically oriented and aligned in pairs such that a top and bottom pair of the apertures 61 may accept the top half of long two piece fishing rods when separated. A top and bottom aperture 61 pair will be placed on both the left side and the right side of bars 44 and 46. The apertures 61 are placed approximately mid-way between one of the fishing rod receptacles 52 and the base 19.

The installation and operation of the first embodiment on a typical sedan or coupe style automobile, as illustrated in FIGS. 1A and 1B, is readily appreciated. Before attaching the holder device 10 to the vehicle or automobile C, a user grips handle 28 with one hand and tilts the device forward approximately 45 degrees from vertical. The user then places a fishing pole or rod and reel R into the open top 52T of each fishing rod receptacle 52 with the opposite hand; letting the reel 12 slide into the top slit 52S of the fishing rod receptacle 52 until the reel 12 rests at the bottom of the slit 52S. If a fishing rod is longer than approximately eight feet or about 2.4 meters, the user may break the rod down into two pieces. Most long or tall rods, such as those for surf fishing, come as two piece poles or portions. In that case, the user would place the reel portion of the two piece rod into the fishing rod receptacle 52 and the top portion of the fishing rod, not separately illustrated, into one pair of vertically aligned apertures 61. The user may use the retaining strap 53 connected to the fishing rod receptacles 52 to further secure the rod and reel R to the holder device 10. With rods inserted into the holder device 10, the user walks up to the back of the car trunk, holds the device near vertical and a few inches or centimeters away from the desired mounting point on the trunk of the automobile C, and then brings the attachment strip 14 in contact with the vehicle or automobile C. If magnets are used on the attachment strip 14, when the magnets gets within about on half inch or 1.27 centimeters of the trunk of the automobile C, the magnets will pull the holding device 10 to the vehicle or automobile C, with an assuring force. Due to the hinges 26 in the connector arms 24, the user is now able to let the device drop with gravity until pad 41 rests against the bumper 13 of the automobile C. The user may have to adjust the distance between the pad 41 and the attachment strip 14 by adjusting the telescoping strut 32. The user is now able to drive the automobile C with the holding device 10 and rods and reels R to his favorite fishing spot at highway speeds and on semi-rough or bumpy roads.

To remove the device, the user first grips the handle 28, and then with the other hand grabs one of the pull tabs 17 on the sides of the attachment strip 14, and slowly pulls the attachment strip 14 off by pulling the tab 17 away from the automobile C body. If magnets are used, they have considerable pulling force to counteract the forces of wind and rough roads, pulling the tab 17 enables the user to pull a small portion of the attachment strip 14 away at a time and therefore considerably reduces the amount of effort required to remove the device.

With reference to FIGS. 1C-1F, there are several features that enable the holder device 10 to be adjustable to many different automobile contours. The desired mounting point on the automobile need only be at least as big as the attachment strip 14. Therefore, the width and length of the attachment strip 14 is minimized as much as possible. Adapting to a concave or convex trunk surface in either the horizontal or vertical plane of the automobile is accommodated by the flexibility provide in both the horizontal and vertical direction by the attachment strip 14. Likewise, the hinges 26 in connector arms 24 provide a means to adjust to a trunk that slants either forward or rearward at the desired location for the attachment strip 14.

Figure 1F:
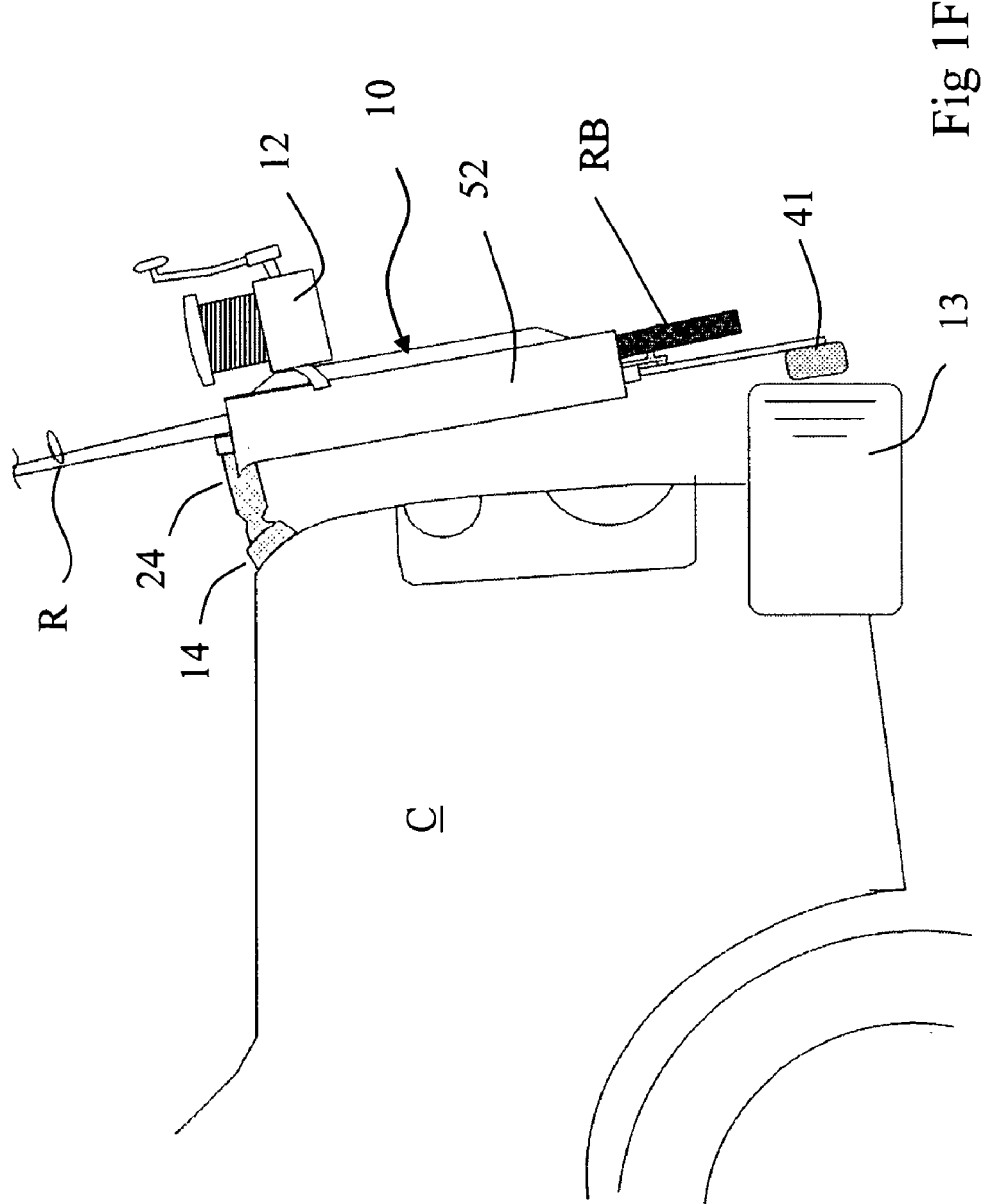
FIG. 1F is a side elevational view illustrating the holder device of an embodiment of the present invention attached to a vehicle or automobile.

FIG. 1F provides an example of a forward slanting trunk with a convex contour in the vertical plane. Fishing rods R with an extended butt end RB, long butt ends are particularly common in saltwater fishing rods, are accommodated by having the pad 41 contact the most rearward surface of the vehicle, namely the bumper 13, thus letting the butt end RB clear the bumper 13. The connector arm 24 has a length that is chosen to be long enough to provide clearance for most cars or automobiles with rear spoilers.

The holding device 10 has several features designed to accommodate the forces associated with the vehicle, rods, and holding device traveling down the road at highway speeds and on reasonable rough or bumpy roads. Wind resistance will act on the portion of the fishing rod and reel R that is above the trunk line, translating to a force attempting to pull the attachment strip 14 away from the vehicle or automobile C. Fundamentally, the forces relate as a simple mechanical lever with the force of the wind on the rods becoming the load, the attractive force of magnets or other means for holding within the attachment strip 14 becoming the effort, and the pad 41 as the fulcrum. Therefore, for a given wind velocity the necessary force of the magnets or other means for holding can be reduced by extending the telescoping strut 32. Conversely, for a given attachment strip 14 design and wind condition, a minimal length from the attachment strip 14 to the pad 41 must be maintained. To this end, the adjustability of the telescoping strut 32 length is purposely limited so as to ensure a minimal length between the pad 41 and the attachment strip 14 is maintained. Wind gusts can also add an additional short term or transient force. This is mitigated by the flexure and resiliency provided by the horizontal bars 44 and 46, which provide dampening in the horizontal direction helping to isolating the gust or wind forces from the attachment strip 14. FIG. 1E illustrates the flexibility of bars 44 and 46 in the horizontal direction which is illustrated in phantom and flexing an angle $F_H$. Additionally, the center of gravity of the fishing reels 12 are placed below the connector arms 24, thereby helping keep the fishing reel and rod R from abruptly tilting forward during hard braking.

Handling road bumps is perhaps the bigger cause of short term forces that the holder device 10 must counteract, these forces have components primarily in the vertical direction. As a protruding bump is encountered, the forces will want to force the fishing rods and reels R and the holding device 10 up and then down, causing rapid accelerating and deceleration of the holding device 10 and fishing rods and reels R. This has the effect of causing mechanical shock of several g-forces, gravitational force, in both directions. The resilient nature of the connector arms 24 and the horizontal bars, 44 and 46, are designed to provide dampening of this shock, thereby isolating the added g-force from the attachment strip 14. In addition, the pivot points associated with each hinge 26 of the connecting arms 24 allow some motion of the combined fishing rod and reel R and holding device 10 relative to the vehicle. Preferably the fishing rod receptacles 52 are placed as close to the vehicle as possible. Keeping the pivots or hinge 26 as close as possible to the vehicle body ensures that the amounts of torque transferred against the attachment strip 14 are minimized.

With reference to the preferred embodiment of FIGS. 1C and 1D, connector arms 24 connect to the attachment strip 14 and are spaced apart approximately 4 inches or 10.2 cm. The base 19 is approximately 12 inches, or 30.5 cm, in height, 4 inches, or 10.2 cm, in width, and 0.375 inches, or 0.95 cm thick. The handle 28 is preferably approximately 8 inches, or 23.3 cm, in length, and 1.5 inches, or 3.8 cm in depth and width, and is offset from the base 19 by approximately 2 inches or 5.1 cm. The base 19, handle 28, and strut 32, are preferably fabricated from thermoplastic materials such as ABS, nylon, and the like. Other materials may be used such as, various thermoset materials such as polyurethane, metal, wood, composite materials, or suitable combinations of these. The handle 28 and base 19 can be fabricated as a single assembly, or alternatively, as two or more pieces with the pieces joined by adhesive bonding, snapped together, or joined with mechanical fasteners, or other equivalent fastening means.

In the preferred embodiment, horizontal bars 44 and 46 are approximately 9.5 inches or 24.1 cm in length by 1 inch or 2.54 cm high by 1 inch or 2.54 cm depth, and apertures 61 are approximately 0.5 inches or 1.27 cm in diameter. Here length refers to the total distance between the two attached rod receptacles 52 for each bar. The bars attach approximate the vertical center of device body 18. In the preferred embodiment of FIGS. 1A-1F, bars 44 and 46 attach with body 18 near the portion where handle 28 connects with base 19. The bars are designed to allow flexure in the vertical and horizontal direction to assist in dampening wind and road shock, respectively, and therefore isolating these forces from the attachment strip 14. Referring to the frontal view of FIG. 1D, flexure in the vertical direction is illustrated as $F_v$ for a downward flexure, with dotted lines indicating the movement of horizontal bar 44 and 46. Each horizontal bar 44 and 46 is designed to flex approximately 5 to 60 degrees, with a preferred flexure of 15 to 45 degrees in the vertical dimension as measured between the center of the bar, where it attaches to base 19, and rod receptacle 52 when a force of approximately 10 lbs, or 4.5N, is applied at the rod receptacle 52 attachment location. Referring to the top view of FIG. 1E, flexure in the horizontal direction is illustrated as $F_H$ for flexure away from the vehicle C, with dotted lines indicating the movement of horizontal bar 44 and 46. In the horizontal dimension, each horizontal bar 44 and 46 is designed to flex about 5 to 55 degrees, with a preferred flexure of 10 to 40 degrees as measured between the center of the bar, where it attaches to base 19, and rod receptacle 52 when a force of approximately 10 lbs, or 4.5 N, is applied at the rod attachment location. In the preferred embodiment, the horizontal bars are fabricated with flexible resilient elastomer material having a Durometer Hardness, Shore A, which is measured per ASTM D2240, ranging from about 50 A to 90 A. Currently the synthetic rubber neoprene with a Shore A value of 60 A is utilized. Alternative materials, meeting the hardness range and same approximate dimensions of the preferred embodiment discussed herein, may be substituted. These alternate materials could include natural rubber, other synthetic rubbers, urethane and polyurethane compounds, TPE compounds such as sold under the trademark Santoprene™, as well as a combination of those compounds. Various other harder less flexible materials may be used while keeping within the scope of the invention if the horizontal bar dimensions are adjusted to achieve the same flexibility. These alternatives include various thermoplastic compounds, harder thermoset compounds, or spring steel or combinations of these.

The fishing rod receptacles 52 may be those that are commercially available. However, the fishing rod receptacles 52 may be any means for holding a fishing rod securely in place, or an equivalent device such as straps, brackets, clips, or other holder. The fishing rod receptacles 52 are commonly made out of plastic, or the like. They are approximately 12 inches or 30.5 cm long, with a diameter of 2 inches or 5.08 cm. Alternatively, variations to the basic rod holding tube may be used while being in the spirit of the current invention. Another variation eliminates the tube, and would attach each fishing rod at two points, one above the reel and one below the reel, with these attachment points coincident with the horizontal bar locations. The fishing rod receptacles 52 may be adhesively bonded to the horizontal bars 44 and 46, or attached by mechanical methods. Rod retaining straps 53 may be fabricated with rubber strips, Velcro hook and loop fasteners, bungee cord or the like. In the preferred embodiment the retaining straps 53 are thin rubber or neoprene strips with a loop 53L on one end. The loops 53L connects to appropriately dimensioned retaining knobs 56.

In the preferred embodiment, both the top horizontal bar 44 and the bottom horizontal bar 46 are each one piece. It is understood that several variations in the horizontal bars 44 and 46 are possible while being within the spirit of the present invention. For example, it is possible to break each horizontal bar 44 and 46 into a left half and right half, and mounting each piece separately to base 19. Conversely, it is possible to integrate both the top and bottom horizontal bar 44 and 46 into one single bar mounted more towards the vertical center of the fishing rod receptacles 52. Similarly, apertures 61 are shown molded as part of the horizontal bars 44 and 46. It is to be understood that small rings or hooks, or other attachment methods could be used. Likewise, the apertures 61 could be attached to the sides of the fishing rod receptacles 52, or to the base 19 while maintaining the spirit of the present invention.

Figure 1H:
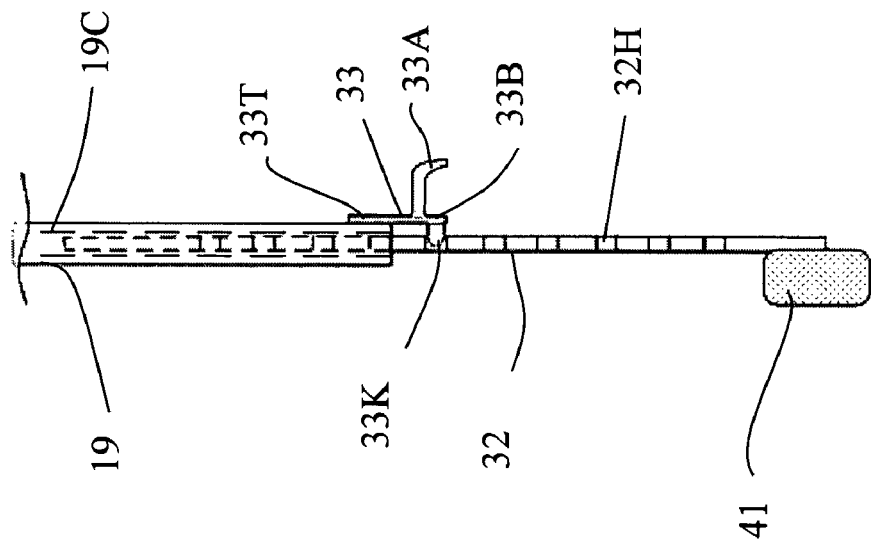
FIG. 1H is a side elevational view illustrating the adjustable strut of an embodiment of the present invention.
Figure 1G:
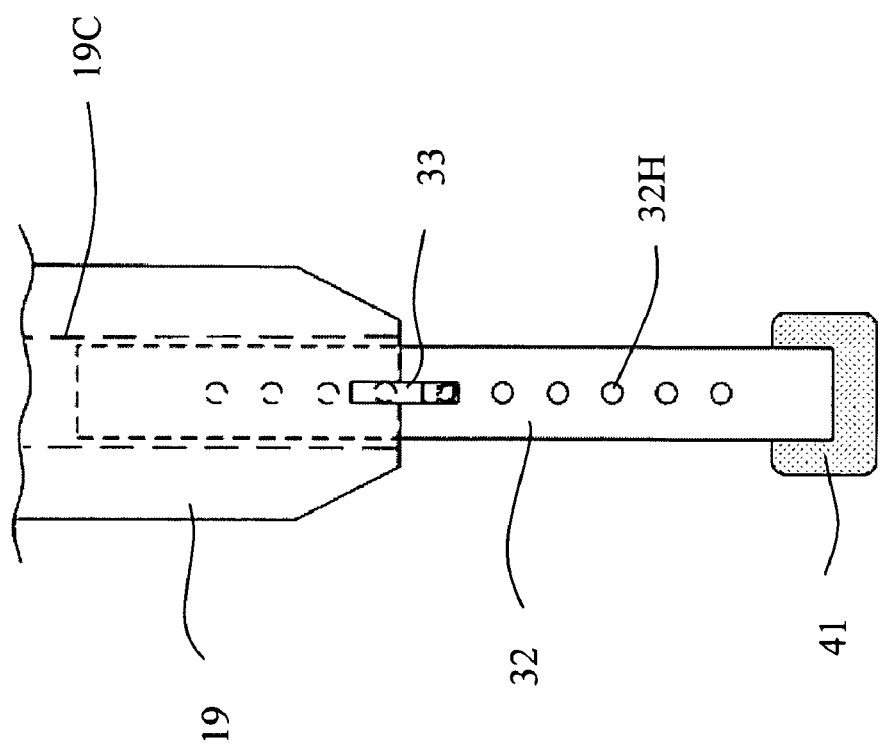
FIG. 1G is a front elevational view illustrating the adjustable strut of an embodiment of the present invention.

FIGS. 1G and 1H are enlarged partial front and side views of the telescoping strut 32. The strut 32 retracts through the bottom end of the base 19 into a hollowed out vertical channel 19C within the base 19. The strut 32 is approximately 1 inch or 2.54 cm in width, 10 inches long, or 25.4 cm, and 0.25 inches, or 0.64 cm thick. A series of evenly spaced small holes 32H are placed along the centerline of the strut. The holes are approximately 0.25 inches, or 0.64 cm in diameter, and spaced 1 inch, or 2.54 cm apart. A retaining clip 33 has its top portion 33T permanently affixed in the center and the bottom of the base 19, and its bottom end 33B abuts against the strut 32 with a small compressive force. At the bottom end 33B of the retaining clip 33 is a small knob 33K that inserts into any one of the small holes 32H in the strut 32, effectively locking the strut 32 in place. Tab 33A on the bottom front of clip 33, is used to pull the retaining clip 33 away from the strut 32, thus pulling the small knob 33K out of its current hole 32, and allowing the strut 32 height or length to be adjusted. The retaining clip 33 is fabricated from durable material, it is preferably made from nylon. The pad 41 is approximately 1 inch, or 2.54 cm tall, 2 inches, or 5.10 cm wide, and 0.75 inch, or 1.90 cm thick. Pad 41 is made from a soft non-marring material such as neoprene rubber.

Figure 1I:
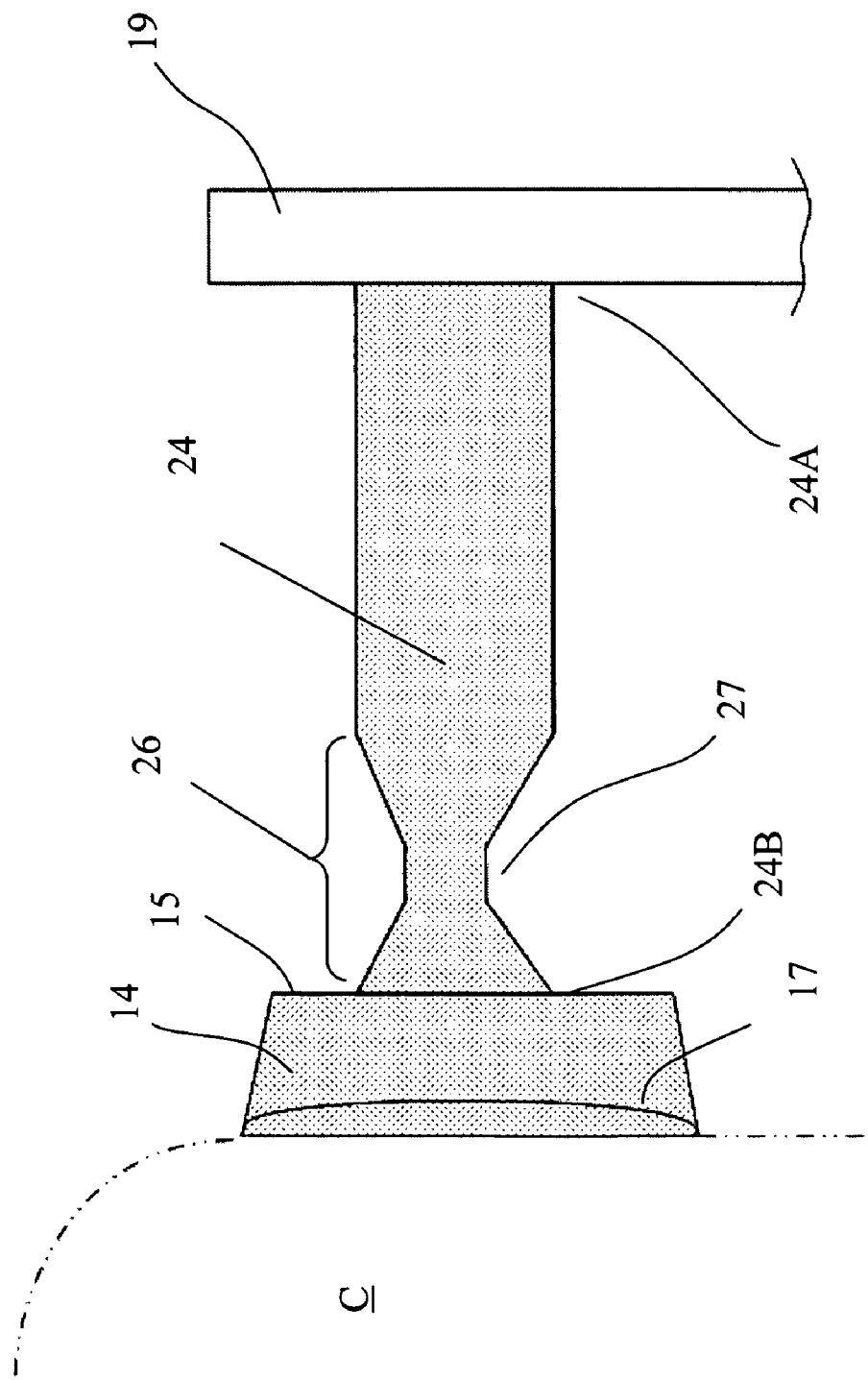
FIG. 1I is a side elevational view illustrating the connector arm of an embodiment of the present invention.

FIG. 1I is an enlarged isolated side view of the attachment strip 14, connector arms 24, hinge 26, and a portion of the top of base 19. The connector arms 24 include means for hinging or hinge 26, whereby the base 19 of the holding device and fishing rod and reel may be allowed to pivot in the vertical direction relative to the attachment strip 14. The preferred embodiment utilizes a cost effective living hinge. The living hinge may be an integral part of the connector arm 24. The term living hinge has the meaning that is currently used in industry that being a hinge fabricated from a single material, with the hinge being achieved by appropriately narrowing or thinning the material at the desire pivot area. The height of each connecting arm is approximately 1.25 inches or 3.2 cm at the interface or connection 24A to the base 19, and at the interface or connection 24B to the attachment strip 14 front surface 15. The connector arm 24 narrows to approximately 0.5 inches or 1.27 cm at the pivot point 27 of hinge 26. The length of each connector arm 24 between the attachment strip 14 and the base is approximately 3 inches or 7.62 cm total, with approximately 0.5 inches or 1.27 cm between the pivot point 27 and the front surface 15, and 2.5 inches or 6.35 cm between the pivot point 27 and the base 19. The thickness of each connector arm 24 is approximately 0.5 inches or 1.27 cm. The connector arms 24 are adhesively bonded to the attachment strip 14 and the base 19 in the preferred embodiment. However, other methods such as molding the attachment strip 14 and connector arms 24 as one assembly, or the attachment strip 14, connector arms 24, and the base 19 as one assembly are possible.

In the preferred embodiment, the attachment strip 14 and the connector arms 24 are fabricated with a flexible resilient elastomer material having a Durometer Hardness, Shore A, which is measured per ASTM D2240, ranging from about 50 A to 80 A. Currently the synthetic rubber neoprene is utilized as the elastomer compound. However, other suitable materials can be used without changing the spirit of the invention, including but not limited to natural rubber, other synthetic rubbers, urethane and polyurethane compounds, TPE compounds such as sold under the trademark Santoprene™, as well as a combination of those compounds. Various other materials may be used while keeping within the scope of the invention. For instance, the harder higher durometer materials including thermoplastic compounds PVC and polypropylene, and the like, may be used if material thicknesses are adjusted to achieve the desired flexibility. In addition, spring steel may be utilized to provide the flexibility desired, or a combination of spring steel with the other types of material mentioned. The attachment strip 14 my also utilize a ball and socket type arrangement behind groups of magnets to aid the device in conforming to the vehicle curvature, or to provide the hinge means or hinge 26 within the connector arms 24, or at the attachment strip 14 and connector arm 24 interface.

FIG. 1J shows an isolated front view of an attachment strip 14a using magnets 77 illustrating the magnetic configuration. Similarly, FIG. 1K shows a cross section top view of the attachment strip 14a, and its attachment to connector arm 24. The attachment strip 14a includes elastic substrate 70 with a back surface 71 which faces the automobile C, and a front surface 15 facing fishing rod receptacles. A thin protective layer 73 is bonded to back surface 71 to protect the automobile C from scratches. The magnets 77 are grouped in pairs, with the two magnets having opposite polarities facing the vehicle or automobile C. Therefore each pair will have a magnet 77N with its north pole facing the back surface 71, and a magnet 77S with its south pole facing the back surface 71. The magnets 77N and 77S that form each pair are to be placed in close proximity to each other. Preferably, a gap 80 of approximately 0.25 inches or 0.64 cm is provided between the two magnets 77N and 77S in a pair. The magnets 77 are placed into a series of recesses 75, with the recess 75 being appropriately dimensioned so that the magnets 77 will lie flush with back surface 71. A strip of high permeable material 78 is placed behind each magnet 77N and 77S pair, opposite the side that faces the automobile C. The strip of permeable material or magnetic shunt 78 is appropriately dimensioned to cover the surfaces of both magnets 77N and 77S in the pair along with the gap 80 between the magnets. The attachment strip 14 in the preferred design has an overall dimension of approximately 1.75 inches or 4.45 cm width, 8 inches or 20.32 cm length, and 0.75 inches or 19.1 cm in thickness. There are eight pairs of magnets in the attachment strip 14 of the holding device, as illustrated in the FIGS. 1J and 1K. The magnets 77 are preferably rare earth magnets, such as neodymium or neodymium iron boron magnets. Each magnet 77 has a surface area of approximately 0.2 sq inches or 1.3 cm$^2$, and depth of 0.25 inches or 0.64 cm. The strips of high magnetic permeable material 78 are preferably 0.125 inch or 0.32 cm thick steel. The elastomer material that forms the elastic substrate 70 and protective layer 73 is preferably neoprene with a Shore A durometer hardness of approximately 60 A.

Although the above magnetic strip design is that of the preferred embodiment, it is understood that variation in the attachment strip 14a magnetic design can be employed while remaining within the scope of the present invention. Alternatively, other magnet types such as Samarium Cobalt, Alnico, or ceramic type magnets can be used. Also, the use of one or more Halbach arrays, a permanent magnet arrangement commonly known to magnetic engineers, could be incorporated. A Halbach array is an arrangement of permanent magnets that augment the magnetic field on one side of the array while cancelling the magnetic field to near zero on the other side. Also, the use of a sheet magnet could be utilized. Perhaps more straightforward would be the use of a smaller set of larger more powerful magnets for the attachment strip 14a.

Figure 2B:
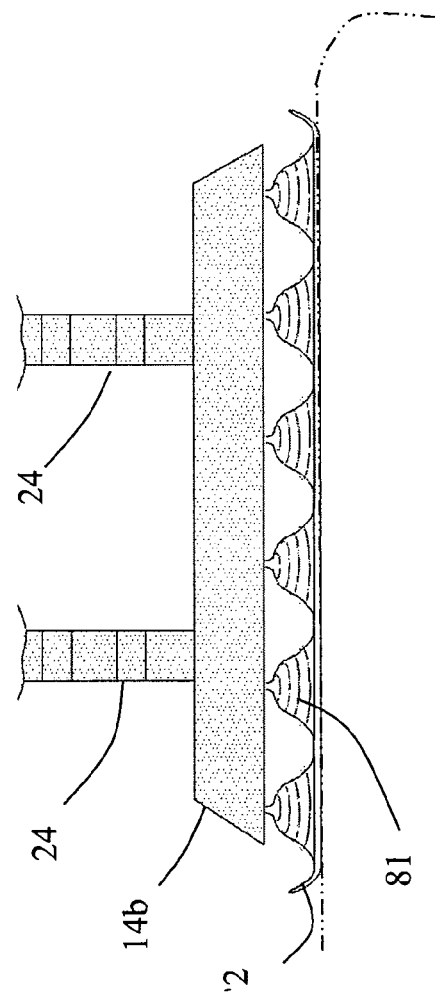
FIG. 2B is a top plan view illustrating an attachment strip using suction cups of an embodiment of the present invention.
Figure 2A:
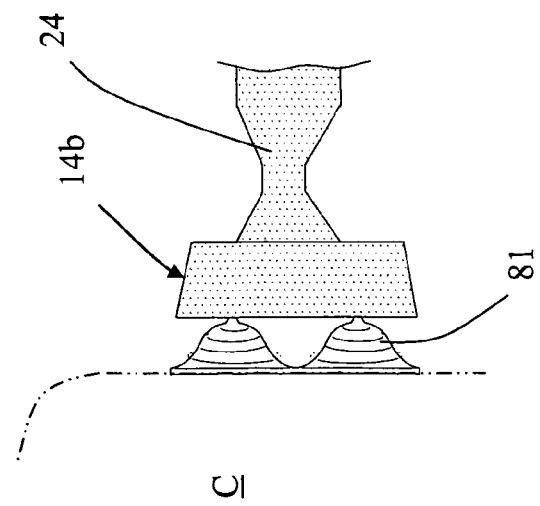
FIG. 2A is a side elevational view illustrating an attachment strip using suction cups of an embodiment of the present invention.

An alternate embodiment of the invention utilizes suction cups, rather than magnets, to achieve the temporary attachment means on the attachment strip. Suction cups have the advantage of being usable on non-ferrous surfaces such as plastic, aluminum, or glass, but have the disadvantage of requiring a clean, smooth, and non-porous surface. FIG. 2A shows an enlarged side view of the attachment strip 14b with suction cups 81 attached, and connector arms 24. FIG. 2B shows an enlarged top view. The suction cups 81 require the user to push each cup against the vehicle body or automobile C, thus creating a vacuum inside the suction cup 81 that creates the force which holds the device to the vehicle or automobile C. The suction cups 81 can be arranged as two rows of relatively small suction cups as illustrated in FIG. 2A. In similar fashion to the attachment strip with magnets of the previous embodiment, the outside edges of adjacent suction cups may be bonded together and a tab 82 provided on one or both sides of the series of suction cups 81 to aid in releasing the suction cups 81. Although a multiple of relatively small suction cups 81 are shown, the use of a fewer set of larger cups, not illustrated, may also be implemented and such implementation should be considered within the spirit of the present invention. Likewise, more sophisticated suction cups that include an integral button or locking switch to create and unlock the vacuum, such as those used on other commercially available devises such as the device sold under the trademark Get-A-Grip™ device, may be incorporated while being within the current scope of the present invention.

FIG. 3A is a perspective view of another embodiment which includes a safety strap 101 added proximate the top of and in the center of the device body 18. The safety strap 101 provides an added safety factor against wind, bumps, possible low lying tree branches, and the like from pulling the holder device 10 off the automobile. Strap 101 attaches in the gap between the trunk or rear hatch and the automobile body utilizing a flat hook 102 which is permanently attached to the end of the safety strap 101. Safety strap 101 feeds through a cam buckle 103. The cam buckle 103 is mounted on a top strap retracting mechanism 100 held within a portion of the handle 28.

For the most part, strap retracting mechanism 100 is designed and fabricated similarly to a common tape measure, with the exception being the typical metal tape is replaced with a safety strap. An exemplar design of strap retracting mechanism 100 is illustrated in the exploded view in FIG. 3B. Strap retracting mechanism 100 is formed by two covers 111 and 112. Cover 112 contains an axle 133. An outlet 113 is on the top side of housing 111 and 112, through which the safety strap 101 exits. Inside the strap retracting mechanism 100, safety strap 101 is coiled around a central hub 129 of reel 114. The reel 114 further includes a pair of upstanding walls 132 spaced to support and guide the safety strap 101 onto the central hub 129 of reel 114. A proximal end of the safety strap 101 is attached to the central 129. As in a conventional tape measure, a wound flat spring 140 is located inside central hub 129 to provide a tension to the safety strap 101. Spring 140 has its end 140A located at the center of the winding attached to axle 133, and the outer winding end 140B attached to the inside circumference of central hub 129. Cap 142 fits over the reel 114.

Figure 3B:
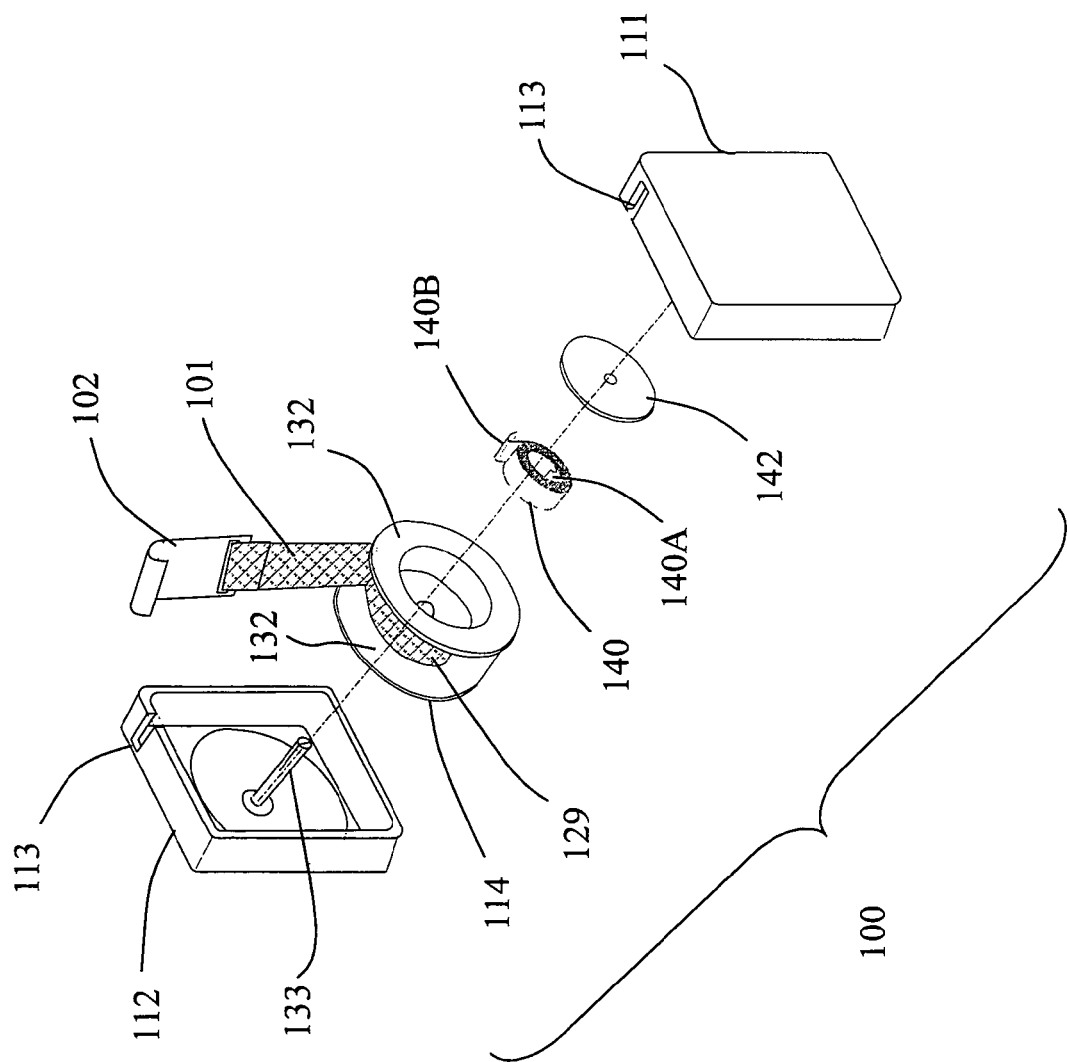
FIG. 3B is an exploded perspective view of a safety strap retraction mechanism.

With reference to FIG. 3A, to install safety strap 101, the user attaches the holder device 10 as previously discussed and then grabs the flat hook 102 with one hand and uses the opposite hand to release cam buckle 103. While holding down on the cam buckle 103, the user pulls the safety strap 101 out enough to attach the flat hook 102 to the automobile at the gap between the trunk and the body of the automobile, not shown. With the cam buckle 103 being held in the released position, the tension caused by the flat spring 140, illustrated in FIG. 3B, ensures the proper tension is applied. Once the cam buckle 103 is released, the safety strap 101 is locked in place, and secured with enough tension to ensure the safety strap 101 does not unduly flap around in the wind. To remove the safety strap 101, a user simply pushes on the cam buckle 103, releases the flat hook 102 from the automobile, and lets the safety strap 101 retract while holding down the cam buckle 103. The safety strap 101 is preferably one inch or 2.54 cm wide polypropylene webbing that is approximately four feet or 1.22 meters in length.

It is understood that minor modification to the described safety strap 101 can be made while still being in the spirit of the present invention. As an example, the self retracting mechanism may be eliminated and simpler manually tightened strap utilizing a ladder lock or equivalent could be used. A ladder lock is a common device in the webbing industry and is quite often seen in bicycle racks placed on the back of automobiles. The ladder lock is a small rectangular piece of hard material slightly wider than the strap and contains two slots that allow the strap to be looped through in a way that friction on the strap and lock will hold the strap without slippage while in use, and lifting of the lock when not in use removes the friction allowing the strap to be lengthened or shortened. In addition, it is recognized that the safety strap 101 may be straight forwardly replaced with a safety cord while still meeting the spirit and scope of the present invention. Also, the materials and dimension described may be modified while still meeting the spirit and scope of the present invention.

Figure 4A:
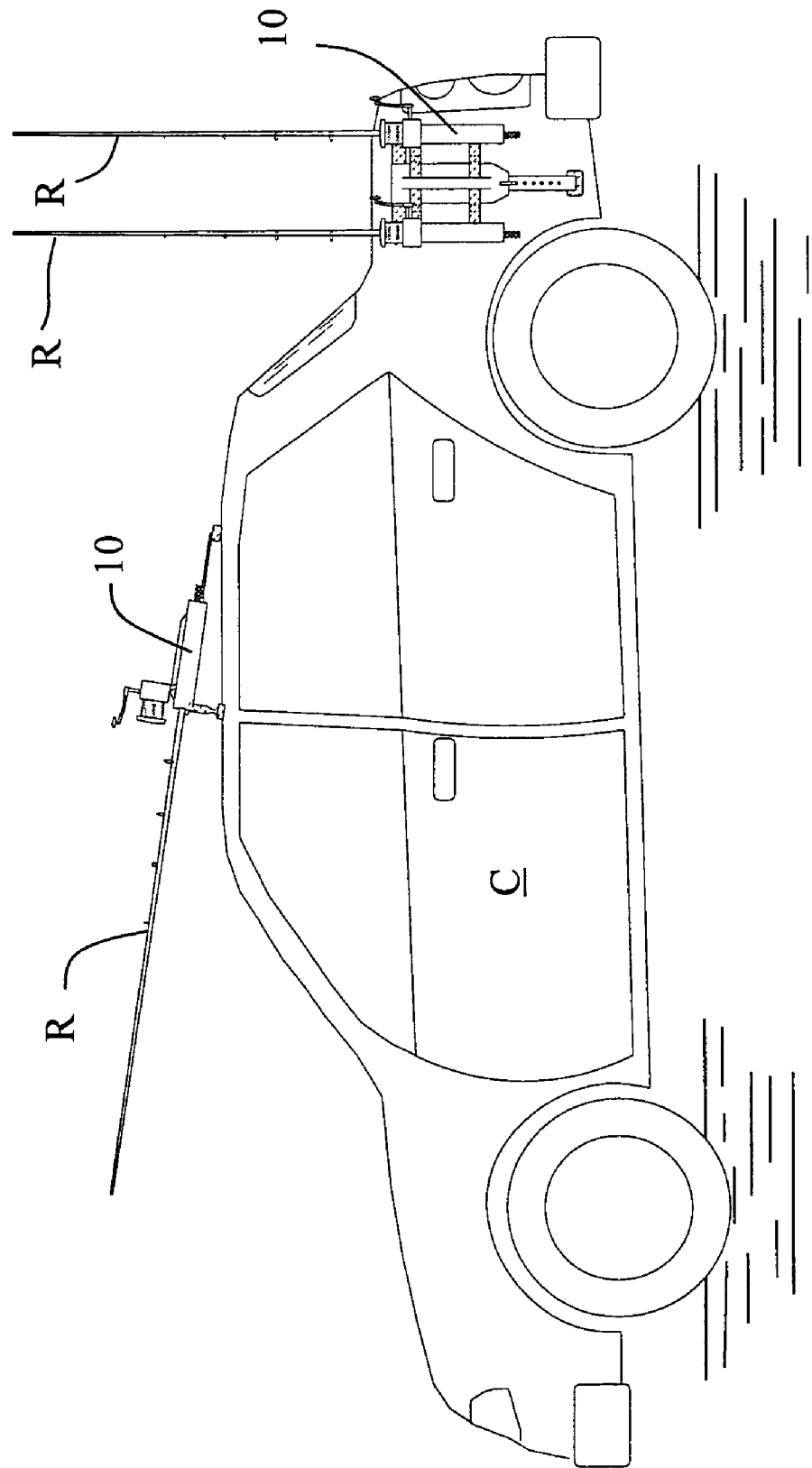
FIG. 4A schematically illustrates attachment of the holder device of the present invention on different locations of an automobile.

So far mounting the device to the rear of an automobile has been discussed. It should be recognized that alternative mountings are possible. FIG. 4A illustrates mounting the holder device 10 on the top of a roof, and the mounting of the holder device 10 to the side of the automobile.

Figure 4B:
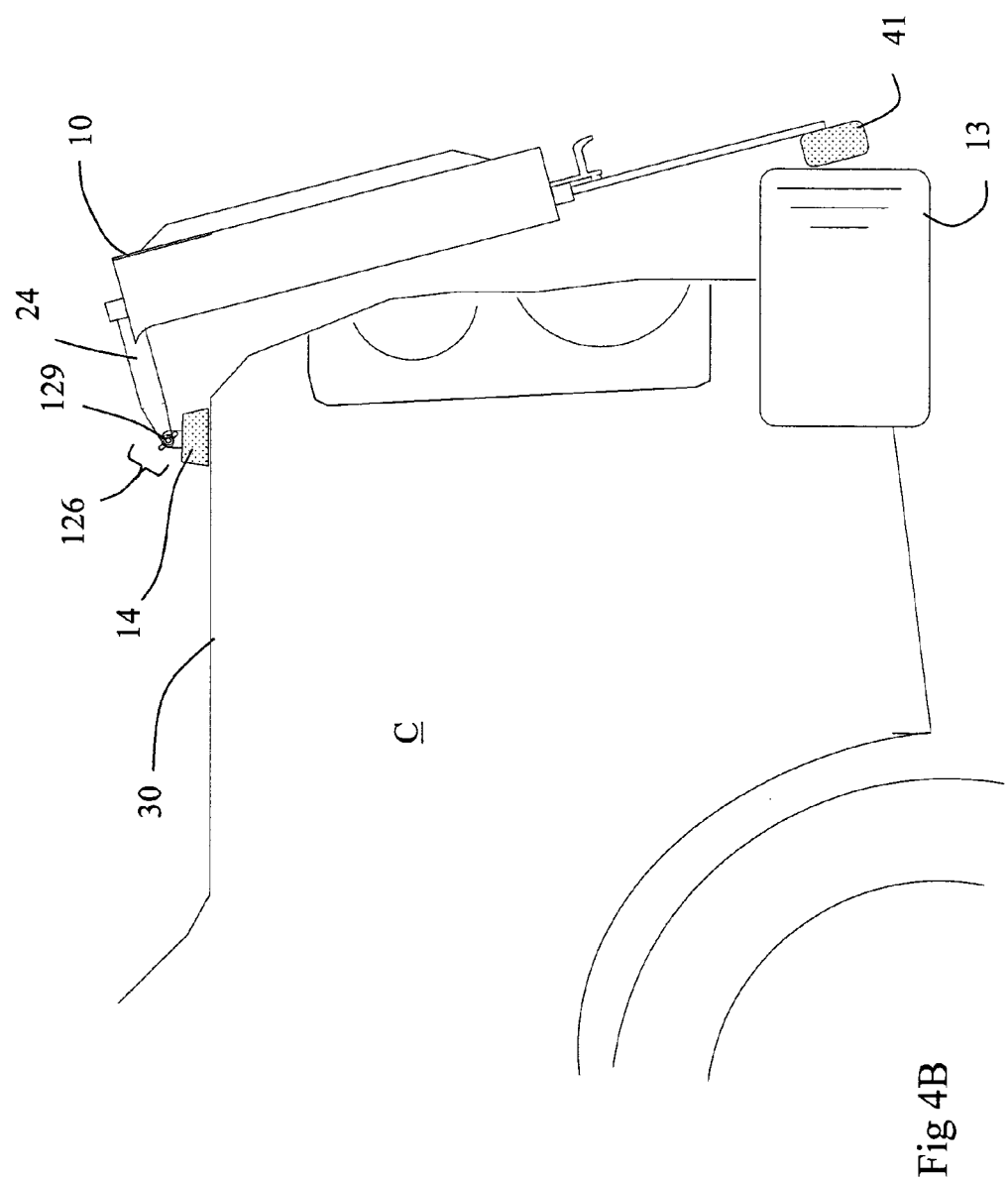
FIG. 4B is a side view schematically illustrating another embodiment of the present invention attached to a horizontal surface of an automobile.

FIG. 4B illustrates mounting the attachment strip 14 at the rear of the automobile C, but on a horizontal portion of a trunk 30. This latter mounting requires a hinge 126 in the connector arms 24 that is capable of achieving the approximately 90 degree angle between the connector arm 24 and the attachment strip 14. This may be achieved with a more traditional style hinge design including a traditional hinge with a pintle 129 as the pivot. With this alternative mounting the same basic design concepts apply, but the amount of force acting on the holder device 10 would differ slightly compared to the mounting technique shown in FIG. 1A and FIG. 1B.

FIGS. 5A and 5B illustrate a side and frontal view of another embodiment, where a rotating strut 91 is provided. The rotation allows the strut 91 to rotate and be locked in place at a selected angle relative to the base 19. This can be used with or without a telescoping feature to the strut. This adds yet more adaptability to fit various automobile contours. The rotation and locking can be achieved with a simple hinge 92 with a bolt and wing nut 93 as illustrated, or with a ratcheting mechanism or with similar well known or equivalent methods.

Described so far has been a rod holding device that includes multiple design features to facilitate quick and easy attachment to a vehicle, and to accommodate the forces associated with wind and road conditions. It should be understood that one or several of these features may be removed from the device while still being within the spirit and scope of the presented invention. For instance, a version of the device may be fabricated without resilient or flexible materials included as part of the top and bottom horizontal bars 44 and 46. Similarly, a device may be fabricated without the resilient or flexible material from the connecting arms 24, or removing the hinge 26 function from the connecting arms 24. Likewise, the strut 32 may be eliminated and the pad 41 attached to the bottom of the base 19. Generally, to meet the same road and wind conditions, removal of one or more of these features from the holder device will require enhancing or "beefing-up" the remaining features, or a modification of the various geometries. Also, removal of some of these features, particularly the telescoping strut 32 or and hinge 26, may reduce the variety of vehicles the device can be mounted on.

Figures 6A, 6B, 6C:
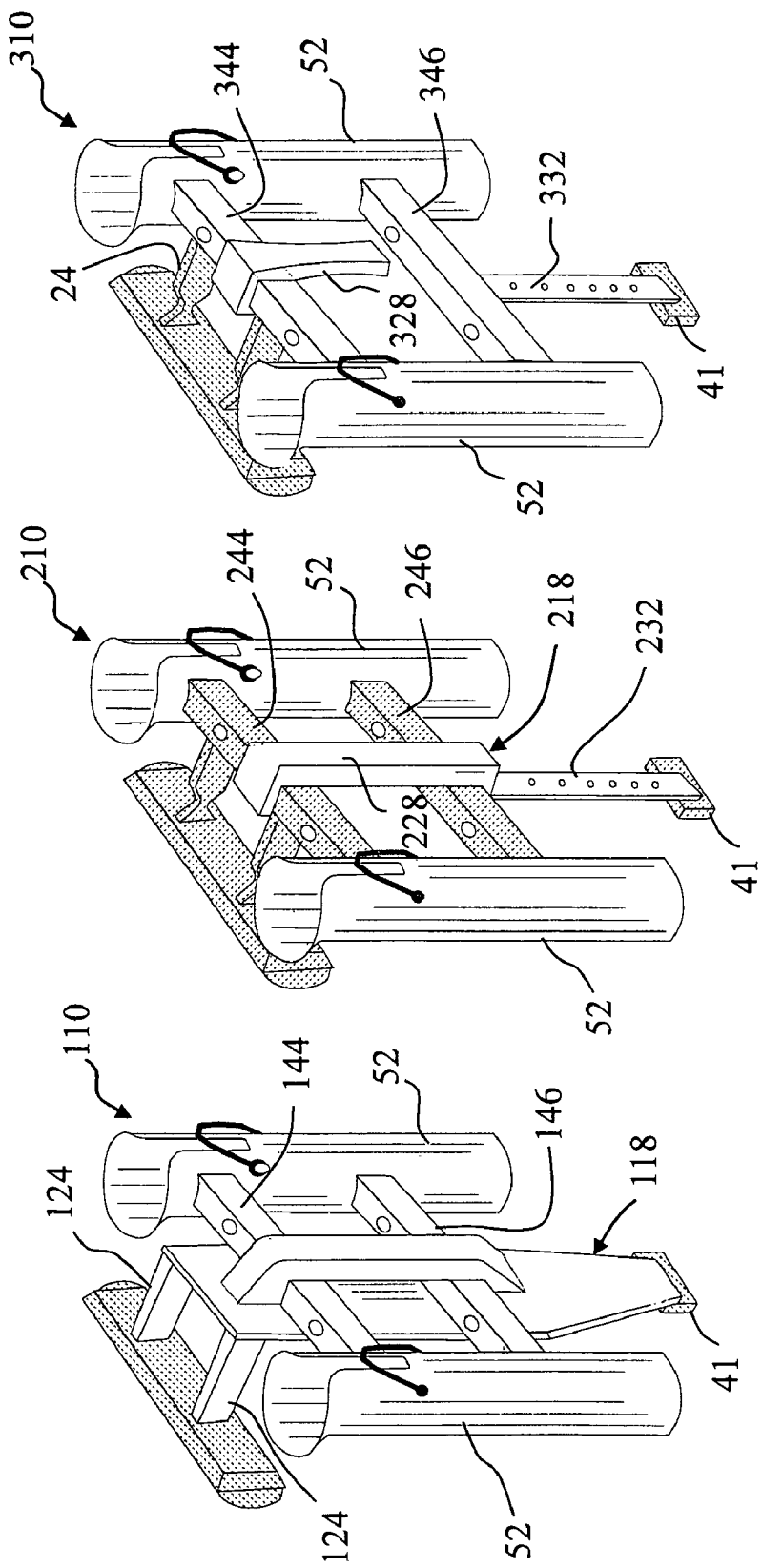
FIG. 6A is a perspective view schematically illustrating another embodiment of the present invention having a rigid connector arm and horizontal bars.
FIG. 6B is a perspective view schematically illustrating another embodiment of the present invention having a handle attached directly to the horizontal bars.
FIG. 6C is a perspective view schematically illustrating another embodiment of the present invention having a cantilevered handle attached directly to the top horizontal bar.

FIG. 6A illustrates a simple embodiment of a holder device 110 in which the flexible features are removed from the, horizontal bars 144 and 146, and the hinge and resilient materials are removed from connector arms 124. In addition, the telescoping strut is removed, and the body 118 is correspondingly simplified.

FIG. 6B illustrates an embodiment of a holder device 210 where the base is essentially eliminated from the device body 218, and the device body 218 is comprised of a handle 228 attached directly to the top horizontal bar 244 and the bottom horizontal bar 246, and the strut 232. If the retractable feature of the strut is included, the handle 218 may also include the channel for the retractable strut.

FIG. 6C illustrates yet another simplified holder device 310 where the top portion has a cantilevered handle 328 attached to the top horizontal bar 344. Adjustable strut 332 and pad 41 are illustrated attached to bottom horizontal bar 332. In this embodiment, fishing rod receptacles 52 would help support the structure vertically.

Figure 6D:
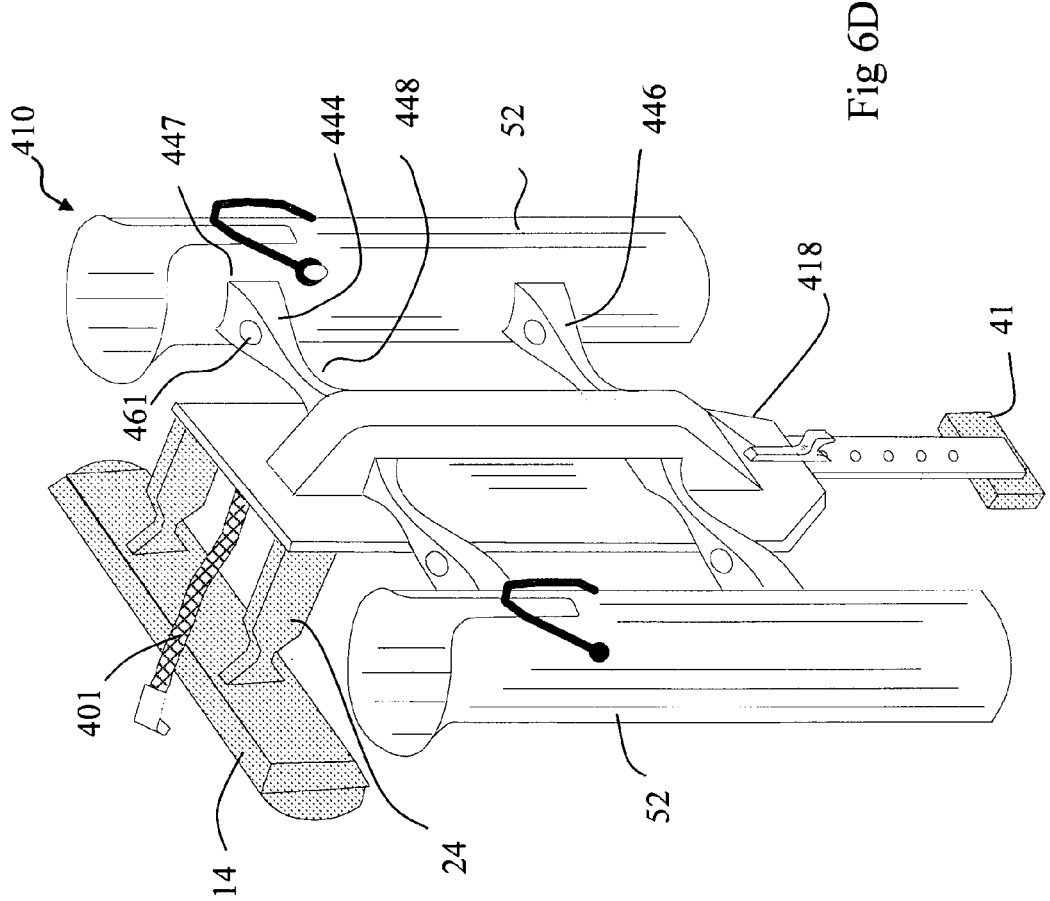
FIG. 6D is a perspective view schematically illustrating another embodiment of the present invention having flexible reduced width horizontal bars.

FIG. 6D is another embodiment that includes flexible horizontal bars 444 and 446 comprised of a harder material such as polypropylene, and a simple manually tightened safety strap 401. The horizontal bars 444 and 446 would be approximately 1.0 by 1.0 inches, or 2.54 cm by 2.54 cm, in cross section at the ends 447 at the fishing rod receptacle, and tapper into a narrower cross section 448 of 0.25 inches, or 0.63 cm, in the vertical direction and by 0.4 inches, or 1.02 cm, in the horizontal direction near the attachment point of the bars with body 418. The widening of the bar cross section near the fishing rod receptacles at ends 447 aids attachment of the fishing rod receptacles 52, as well as providing space for apertures 461. The narrower cross section area 448 of the horizontal bars 444 and 446 being appropriately dimensioned to provide the flexibility of the horizontal bars as discussed previously as part of the preferred embodiment. For the approximate dimensions of the bars listed above, the material would have a Flexural Modulus, measured per ASTM D790, of between 160,000 and 250,000 psi, or 1,103 MPa and 1,723 MPa. As is a common practice in the plastics industry, the use of Flexural Modulus is used in this embodiment as it is a better measure of the flexural characteristics of harder materials, compared to the durometer that was utilized in the preferred embodiment which was constructed from elastomer or softer materials. This embodiment is appropriately dimensioned for use with polypropylene plastic, although alternative plastics and polyurethanes with near equivalent Flexural Modulus may be used with the above dimensions. Also, stiffer and harder materials may be used for the horizontal bars 444 and 446 while still providing similar flexibility if the cross section of the material is reduced appropriately. The narrower cross section areas 448 permit the fishing rod receptacles 52 when loaded with fishing rods, not illustrated, to move up and down in a vertical direction as different loads are placed on the fishing receptacles 52 due to movement of the vehicle and vibrations from the road. The horizontal bars 444 and 446 may also move in the horizontal direction in a direction substantially perpendicular to the horizontal bars 444 and 446 longitudinal axis. This flexibility and permitted movement greatly reduces the likelihood that the attachment strip 14 will become separated from the vehicle, as the flexing of the horizontal bars 444 and 446 tend to absorb impulse loads providing more gradual vertical forces to be applied to the attachment strip 14. Similarly, parallel connector arms 24 are compliant in the horizontal and lateral direction and absorb impulse loads in the horizontal and lateral direction preventing more gradual horizontal forced to be applied to the attachment strip 14. The force required for flexing the paralleled connector arms 24 and the horizontal bars 444 and 446 should be less than the predetermined force required to move or separate the attachment strip 14 from the vehicle. Preferably, the force required for flexing is substantially less than the predetermined force required to move or separate the attachment strip 14 form the vehicle.

Also, it should be recognized that embodiments utilizing additional rod holding receptacles can be incorporated into the holder device while keeping within the spirit of the current invention, not illustrated. As another example of a possible embodiment, the handle may be replaced with a third rod holding receptacle making a three rod holding device with the center receptacle serving a dual purpose as a rod holding receptacle and a handle, not illustrated.

It is also generally recognized that minor design Variations can be made while keeping inline with the spirit of the current invention. For instance, the attachment strip 14 of the previously discussed preferred embodiment illustrated in FIG. 1J and FIG. 1K may be modified in various ways.

Figure 7B:
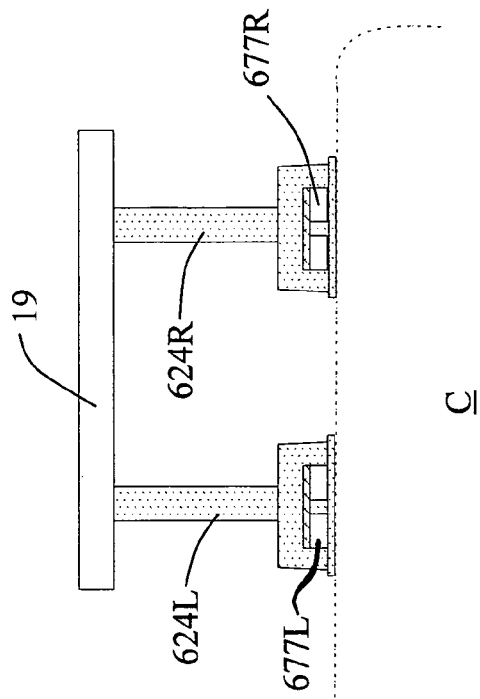
FIG. 7B is a top view of schematically illustrating another embodiment of the present invention having separated multiple attachment strips with magnets.
Figure 7A:
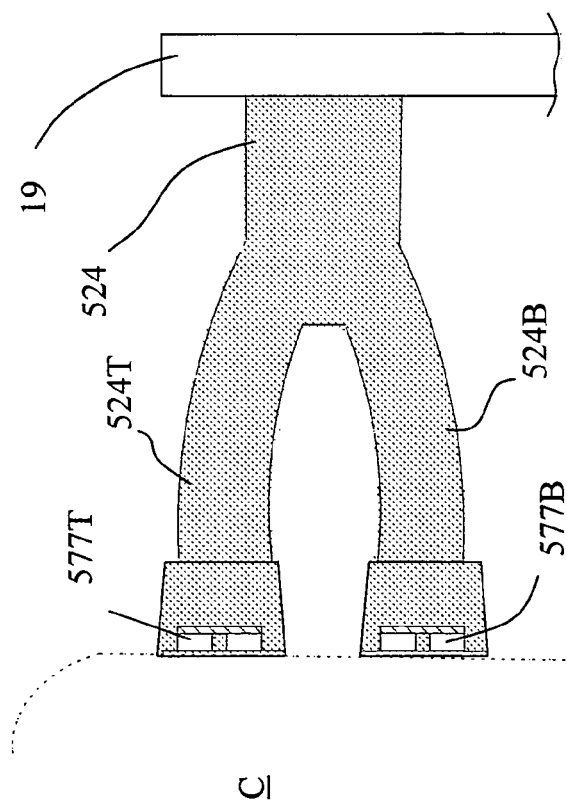
FIG. 7A is a side view schematically illustrating another embodiment of the present invention having a bifurcated connector arm.

For example, FIGS. 7A and 7B illustrates a side and top view of attachment strips and connector arms of alternative embodiments that uses a non-contiguous or separated attachment strips. In FIG. 7A a set of top and bottom magnets 577T and 577B are associated with split or bifurcated connector arms 524T and 524B of connector arm 524, and the top and bottom magnets 577T and 577B are separated at the interface to the vehicle. The connector arm 524 is connected to the base 19. In FIG. 7B individual left and right magnets 677L and 677R are attached to individual left and right connector arms 624L and 624R, which are attached to base 19. The left and right magnets 677L and 677R form non-contiguous or separated attachment strips.

The holder device of the present invention provides a relatively simple device that is securely held to an automobile and provides sufficient flexibility so as not to be unintentionally knocked off of the vehicle during high speeds or travel along rough or bumpy roads. Accordingly, the present invention improves upon existing devices.

While the present invention has been illustrated and described with respect to several different preferred embodiments, it will be appreciated to those skilled in the art the various modifications may be made without departing from the spirit and scope of the present invention.

What is claimed is:

1. A holder device releasably attached to a vehicle comprising:
    a body having a top end and a bottom end;
    horizontal bars attached to said body;
    receptacles attached to said horizontal bars;
    a pair of connector arms, each of said pair of connector arms having one end attached to said body adjacent the top end;
    only one horizontal single flexible attachment strip attached to said pair of connector arms adjacent to the top end of the body, said attachment strip capable of being releasably attachable to only an exterior surface of the vehicle; and
    a pad attached to said body at the bottom end,
    whereby the holder device is adapted to be releasably attached only to a surface of the vehicle and providing a secure attachment capable of absorbing loads without being unintentionally dislodged from the vehicle.

2. A holder device releasably attached to a vehicle as in claim 1 further comprising:
    a hinge formed on each of said pair of connector arms.

3. A holder device releasably attached to a vehicle as in claim 1 wherein:
    said attachment strip comprises a plurality of magnets.

4. A holder device releasably attached to a vehicle as in claim 1 wherein:
    said attachment strip comprises a plurality of suction cups.

5. A holder device releasably attached to a vehicle as in claim 1 further comprising:
    a length adjustable strut having an upper end and a lower end, the upper end attached to the bottom end of said base, and the pad attached to the lower end of the strut, for contacting a surface portion of the vehicle.

6. A holder device releasably attached to a vehicle as in claim 1 further comprising:
    a safety strap attached approximate the top of the holder device.

7. A holder device releasably attached to a vehicle as in claim 6 wherein:
    said safety strap is retractable.

8. A holder device releasably attached to a vehicle as in claim 1 wherein:
    said pair of connector arms and said horizontal bars are flexible.

9. A fishing rod holder device for carrying a fishing rod attached to a vehicle comprising:
    a base having a top portion and a bottom portion;
    a pair of flexible connector arms arranged parallel to and horizontal to one another, each one of said pair of flexible connector arms having a proximal end attached to the top portion of said base;
    an upper single horizontal attachment strip attached to a distal end of each one of said pair of flexible arms adjacent to the top portion of said base, wherein said attachment strip is releaseably attachable only to an external surface of the vehicle; and
    a fishing rod receptacle attached to said base and adapted to receive and hold said fishing rod to said base,
    a pad attached to the bottom portion of the base for supporting the base against the vehicle, wherein the holder device only contacts the vehicle by the single horizontal attachment strip and the pad, and whereby the fishing rod is held in the holder device attached to a vehicle and transported.

10. A fishing rod holder device for carrying a fishing rod attached to a vehicle as in claim 9 further comprising:
    a hinge formed on each of said pair of flexible connector arms.

11. A fishing rod holder device for carrying a fishing rod attached to a vehicle as in claim 10 wherein:
    said hinge is a living hinge.

12. A fishing rod holder device for carrying a fishing rod attached to a vehicle as in claim 9 further comprising:
    a horizontal bar attached between said base and said fishing rod receptacle.

13. A fishing rod holder device for carrying a fishing rod attached to a vehicle as in claim 9 wherein:
    said attachment strip comprises a plurality of magnets.

14. A fishing rod holder device for carrying a fishing rod attached to a vehicle as in claim 13 wherein:
    the plurality of magnets comprise magnet pairs having opposing polarities and coupled by a magnetic shunt.

15. A fishing rod holder device for carrying a fishing rod attached to a vehicle as in claim 9 wherein:
    said attachment strip comprises a plurality of suction cups.

16. A fishing rod holder device for carrying a fishing rod attached to a vehicle as in claim 9 further comprising:
    a length adjustable strut having an upper end and a lower end, the upper end attached to the bottom portion of said base; and
    the pad attached to the lower end of the strut, for contacting a surface portion of the vehicle.

17. A fishing rod holder device for carrying a fishing rod attached to a vehicle as in claim 9 further comprising:
    a safety strap.

18. A fishing rod holder device for carrying a fishing rod attached to a vehicle comprising:
    a base having a top portion and a bottom portion;
    a pair of flexible connector arms, each one of said pair of flexible connector arms having a proximal end attached to the top portion of said base;
    an attachment strip attached to a distal end of each one of said pair of flexible arms, wherein said attachment strip is capable of releasably attaching to the vehicle; and
    a fishing rod receptacle attached to said base and adapted to receive and hold said fishing rod to said base,
    whereby the fishing rod is held in the holder device attached to a vehicle and transported;
    horizontal bars attached to said base; and
    means for holding a separated top portion of a fishing pole.

19. A fishing rod holder device for carrying a fishing rod attached to a vehicle as in claim 18 wherein
said means for holding a portion of a fishing pole comprises apertures formed in said horizontal bars.

20. A fishing rod holder device for carrying a fishing rod attached to a vehicle comprising:
a vertically oriented base having a top portion and a bottom portion;
at least one connector arm, said at least one connector arm having a proximal end attached to the top portion of said base;
a flexible horizontal bar attached to said base, said flexible horizontal bar providing flexibility and resiliency in a vertical direction;
a single horizontal member attached to a distal end of said at least one connector arm, the single horizontal member for releasably attaching the holder device only to an external surface of the vehicle; and
at least one receptacle attached to said base, for holding a fishing rod;
whereby the fishing rod is held in the holder device attached to a vehicle and transported.

21. A fishing rod holder device for carrying a fishing rod attached to a vehicle as in claim 20 further comprising:
a hinge placed on said at least one connector arm.

22. A fishing rod holder device for carrying a fishing rod attached to a vehicle as in claim 20 wherein:
said single horizontal member comprises a plurality of magnets.

23. A fishing rod holder device for carrying a fishing rod attached to a vehicle as in claim 22 wherein:
the plurality of magnets comprises pairs of magnets having opposing poles and separated by a gap, and a shunt coupled to said opposing poles.

24. A fishing rod holder device for carrying a fishing rod attached to a vehicle as in claim 20 wherein:
said single horizontal member comprises a plurality of suction cups.

25. A fishing rod holder device releasably attached to a vehicle for carrying a fishing rod comprising:
a base having a top portion and a bottom portion;
a pair of flexible connector arms, each of said pair of flexible connector arms having a proximal end attached to the top portion of said base and a distal end;
a living hinge placed adjacent the distal end of each of said pair of flexible connector arms;
releasable attachment means, attached to said living hinges at the distal end of each of said pair of flexible connector arms, for releasably attaching to the vehicle; and
a pair of flexible horizontal bars attached to said base, said pair of flexible horizontal bars providing flexibility and resiliency in both a vertical and horizontal direction;
a pair of fishing rod receptacles, one of said pair of fishing rod receptacles attached to each end of said pair of flexible horizontal bars; and
a telescoping adjustable strut attached to the bottom portion of said base,
whereby said fishing rod holder device is securely releasably attached to a vehicle and said pair of flexible connector arms and said pair of flexible horizontal bars absorb forces generated by movement of the vehicle preventing the fishing rod holder device from unintentionally becoming dislodged from the vehicle and the fishing rod holder device is securely held even when the vehicle travels at high speeds and over bumpy roads.

26. A fishing rod holder device releasably attached to a vehicle for carrying a fishing rod as in claim 25 wherein:
said releasable attachment means comprises a plurality of magnets.

27. A fishing rod holder device releasably attached to a vehicle for carrying a fishing rod as in claim 25 wherein:
said releasable attachment means comprises a plurality of suction cups.

28. A fishing rod holder device releasably attached to a vehicle for carrying a fishing rod comprising:
a single attachment strip capable of releasably attaching the rod holder device only to a surface portion of a vehicle with a predetermined attachment force;
a connector arm attached to said attachment strip, said connector arm being flexible in a first direction when subject to a first force in the first direction;
a vertically oriented base attached to said connector arm;
a flexible bar connected to said base, said flexible bar being flexible in a second direction when subjected to a second force in the second direction;
a fishing rod receptacle attached to each end of said flexible bar;
a pad attached to a lower portion of the base below the single attachment strip, the lower pad only for contacting another surface portion of the vehicle, wherein no other components of the holder device other than the single attachment strip and the lower pad contact the vehicle,
and
wherein the predetermined attachment force is greater than the first and second forces,
whereby the fishing rod holder device does not become separated from the vehicle when the fishing rod receptacle moves.

29. A fishing rod holder device releasably attached to a vehicle for carrying a fishing rod comprising:
an attachment strip;
attachment means, mounted on said attachment strip, for releasable attaching said attachment strip to an vehicle with a predetermined attachment force;
a base;
a pair of flexible connector arms connecting said base and said attachment strip, said pair of flexible connector arms flexing in a first direction when subject to a first force in the first direction;
a pair of flexible bars having a center portion and first and second ends, the center portion of said pair of flexible bars attached to said base, said pair of flexible bars being flexible in a second direction when subjected to a second force in the second direction; and
wherein said first and second directions are substantially perpendicular and said first and second forces are less than the predetermined attachment force,
whereby the fishing rod holder device does not become separated from the vehicle when the fishing rod receptacle moves.

30. A fishing rod holder device releasably attached to a vehicle for carrying a fishing rod as in claim 29 further comprising:
narrower cross section areas between the first and second ends and the center portion of said pair of flexible bars; and
a hinge in each of said pair of flexible connector arms.

31. A holder device releasably attached to a vehicle comprising:
a vertically oriented body having a top end and a bottom end and a longitudinal axis between the top end and the bottom end;

horizontal bars having a center portion and first and second ends and a longitudinal axis between the first end and the second end, the center portion of the horizontal bars attached to said body, the horizontal bars being perpendicular to the longitudinal axis of the vertically oriented body;

receptacles attached to said horizontal bars;

a pair of connector arms, each of said pair of connector arms having one end attached to said body adjacent the top end, each of said pair of connector arms having a longitudinal axis, the longitudinal axis of each of said pair of the connector arms being perpendicular to the longitudinal axis of the horizontal arms;

an attachment strip attached to said pair of connector arms, said attachment strip capable of releasably attaching to the vehicle; and a pad attached to said body at the bottom end, whereby the holder device is releasably attached to the vehicle and providing a secure attachment capable of absorbing loads without being unintentionally dislodged from the vehicle.

* * * * *